United States Patent
Kajimura et al.

(10) Patent No.: US 9,282,229 B2
(45) Date of Patent: Mar. 8, 2016

(54) AUDIO PROCESSING APPARATUS, AUDIO PROCESSING METHOD AND IMAGING APPARATUS

(71) Applicant: CANON KABUSHIKI KAISHA, Tokyo (JP)

(72) Inventors: Fumihiro Kajimura, Kawasaki (JP); Masafumi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 487 days.

(21) Appl. No.: 13/678,721

(22) Filed: Nov. 16, 2012

(65) Prior Publication Data
US 2013/0141598 A1    Jun. 6, 2013

(30) Foreign Application Priority Data
Dec. 1, 2011    (JP) .................................. 2011-264109

(51) Int. Cl.
H04B 15/00    (2006.01)
H04R 3/02    (2006.01)
H04N 5/228    (2006.01)
H04N 5/232    (2006.01)

(52) U.S. Cl.
CPC ............... *H04N 5/228* (2013.01); *H04B 15/00* (2013.01); *H04N 5/232* (2013.01)

(58) Field of Classification Search
CPC ...... G10L 25/93; G11B 20/1057; H04R 3/12; H04R 27/00; H04N 5/228; H04N 5/232; H04B 15/00
USPC ......... 381/56, 58, 61, 71.1, 71.8–71.14, 73.1, 381/94.1–94.4, 94.7–94.9, 119; 700/94; 369/2–5; 348/231.3; 396/312; 704/226, 704/233
See application file for complete search history.

(56) References Cited

U.S. PATENT DOCUMENTS

| | | | | |
|---|---|---|---|---|
| 7,596,231 B2* | 9/2009 | Samadani | ........... | G10L 21/0208 381/94.1 |
| 2004/0234079 A1* | 11/2004 | Schneider | .............. | H03G 7/002 381/58 |
| 2006/0265218 A1* | 11/2006 | Samadani | ........... | G10L 21/0208 704/233 |
| 2011/0255710 A1* | 10/2011 | Toyama | ................ | H04R 3/007 381/94.4 |

FOREIGN PATENT DOCUMENTS

| | | |
|---|---|---|
| JP | 2007-316254 A | 12/2007 |
| JP | 2008-077707 | 4/2008 |
| JP | 2011-002723 A | 1/2011 |

OTHER PUBLICATIONS

Nov. 30, 2015 Japanese Office Action, which is enclosed without an English Translation that issued in Japanese Patent Application No. 2011-264109.

* cited by examiner

*Primary Examiner* — Vivian Chin
*Assistant Examiner* — William A Jerez Lora
(74) *Attorney, Agent, or Firm* — Cowan, Liebowitz & Latman, P.C.

(57) ABSTRACT

A processor combines a first predicted signal generated based on an audio signal in an interval preceding a noise detection interval, and a second predicted signal generated based on an audio signal in an interval succeeding the noise detection interval, based on the ratio between the periodicity of the audio signal in the interval preceding the noise detection interval, and the periodicity of the audio signal in the interval succeeding the noise detection interval. The processor replaces the audio signal in the noise detection interval with the combined signal.

13 Claims, 19 Drawing Sheets

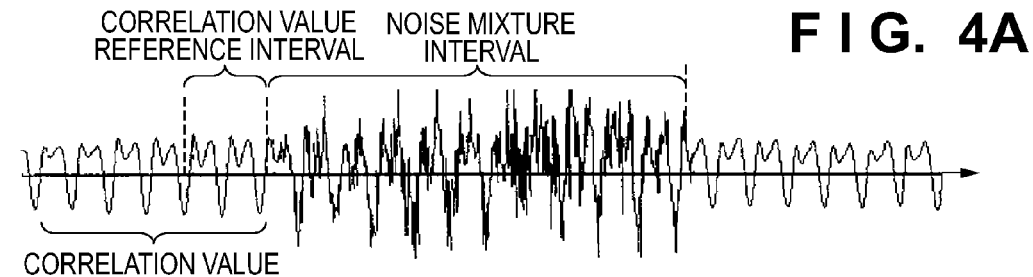
FIG. 4A
FIG. 4B
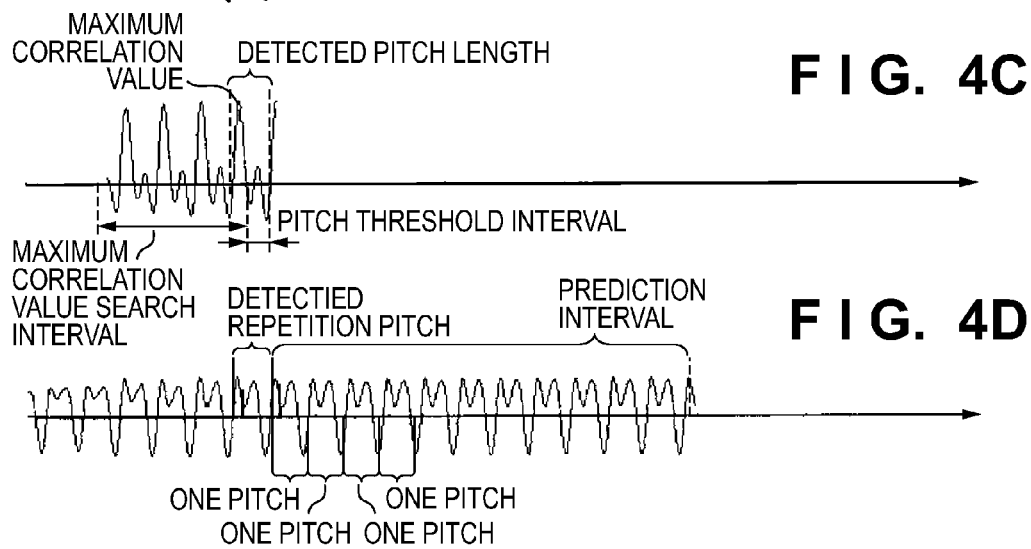
FIG. 4C
FIG. 4D
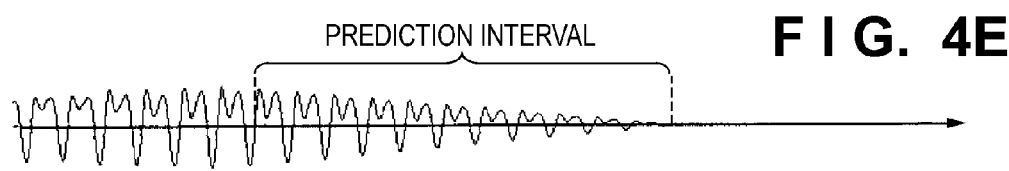
FIG. 4E
FIG. 4F
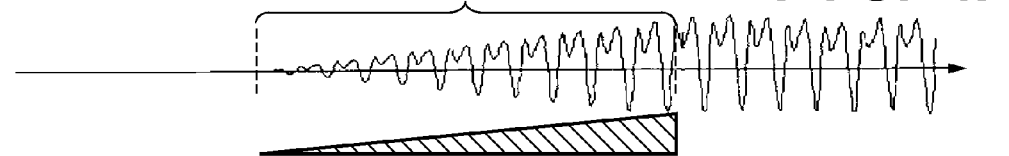
FIG. 4G

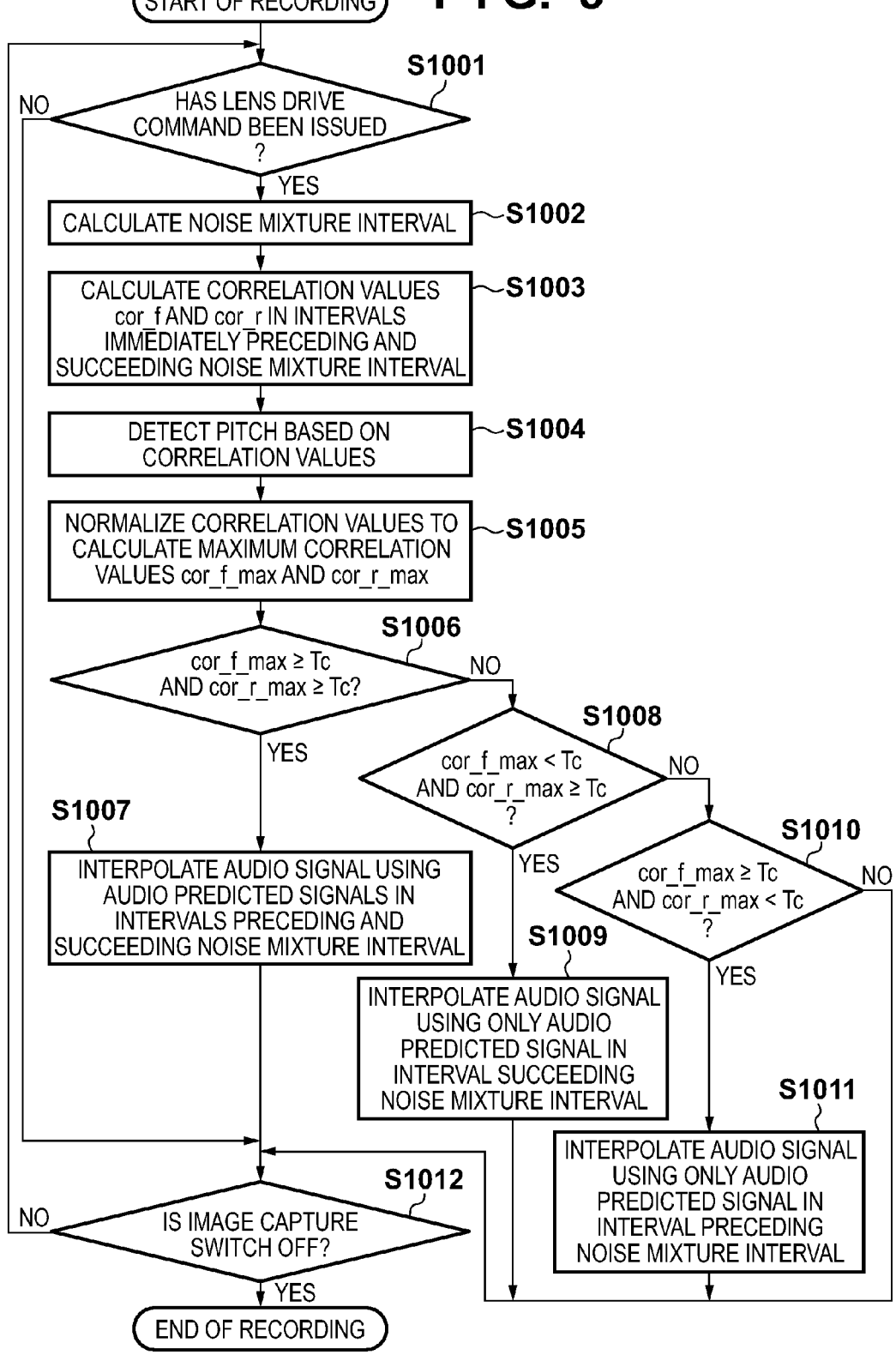

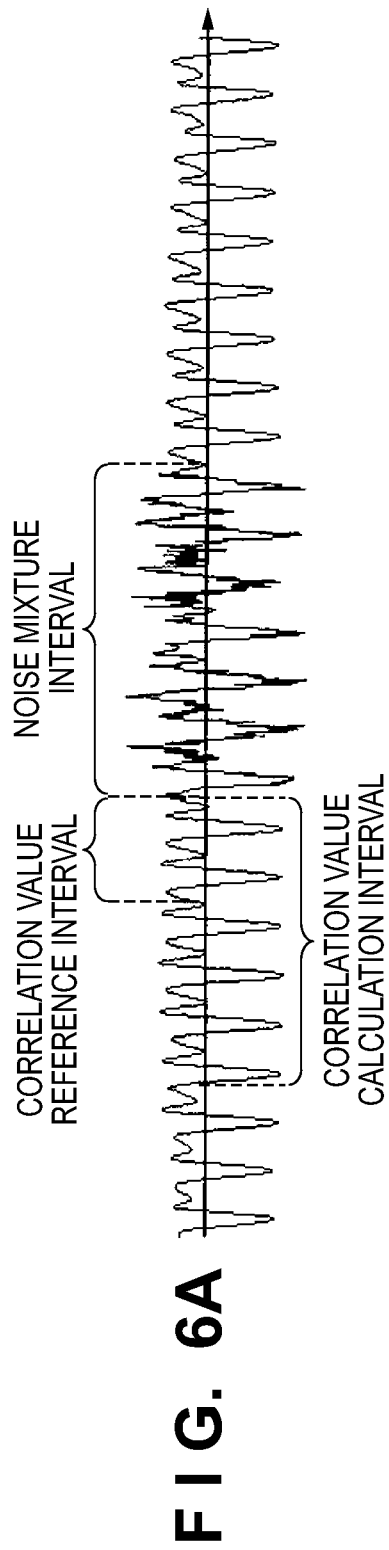
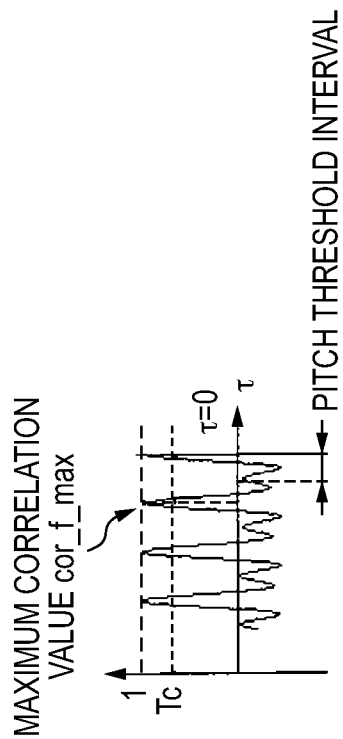
FIG. 6A
FIG. 6B
FIG. 6C

F I G. 8
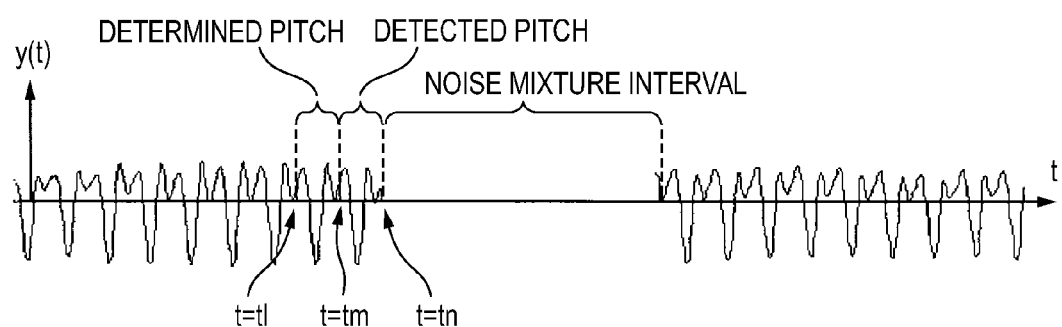

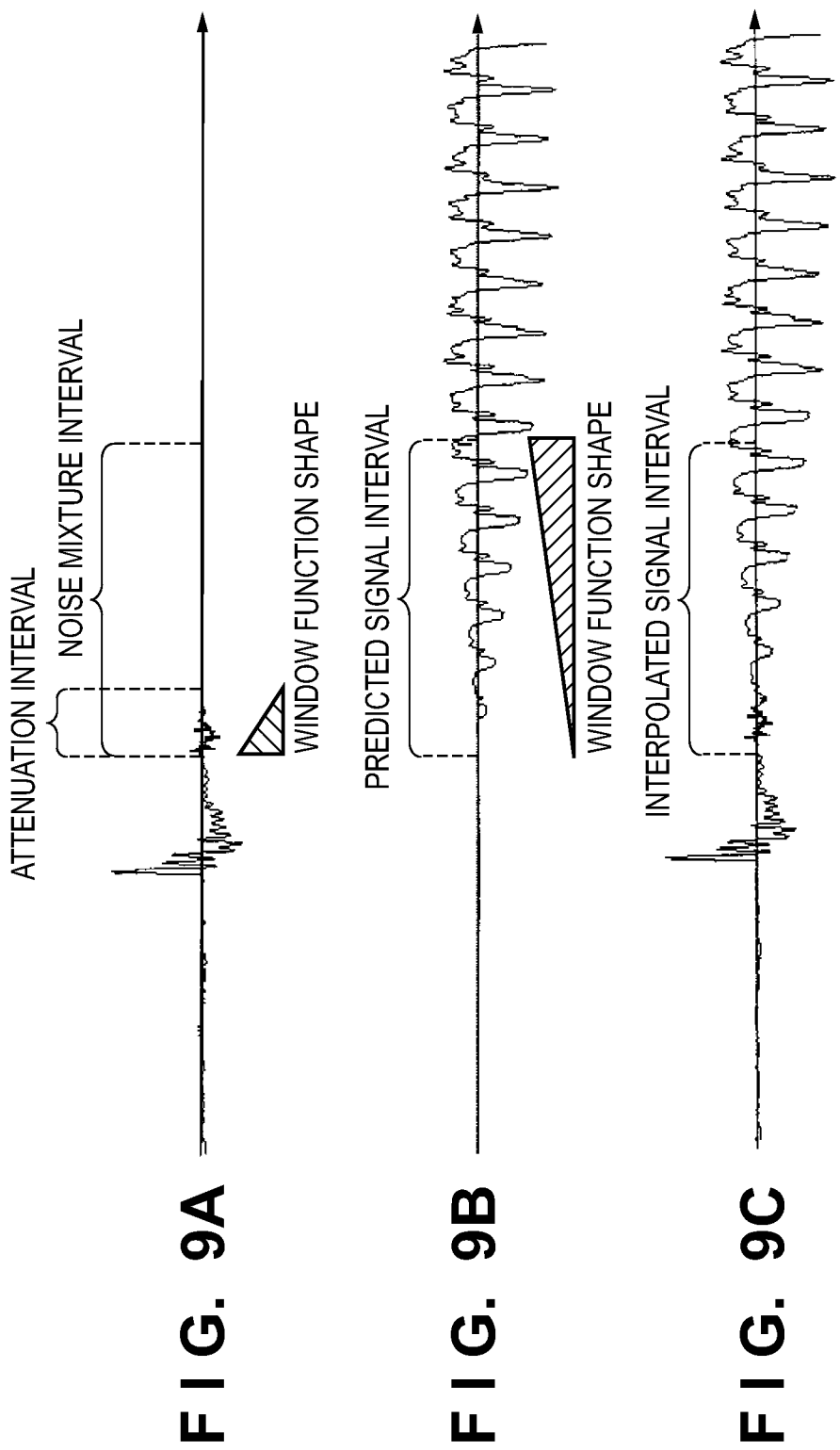

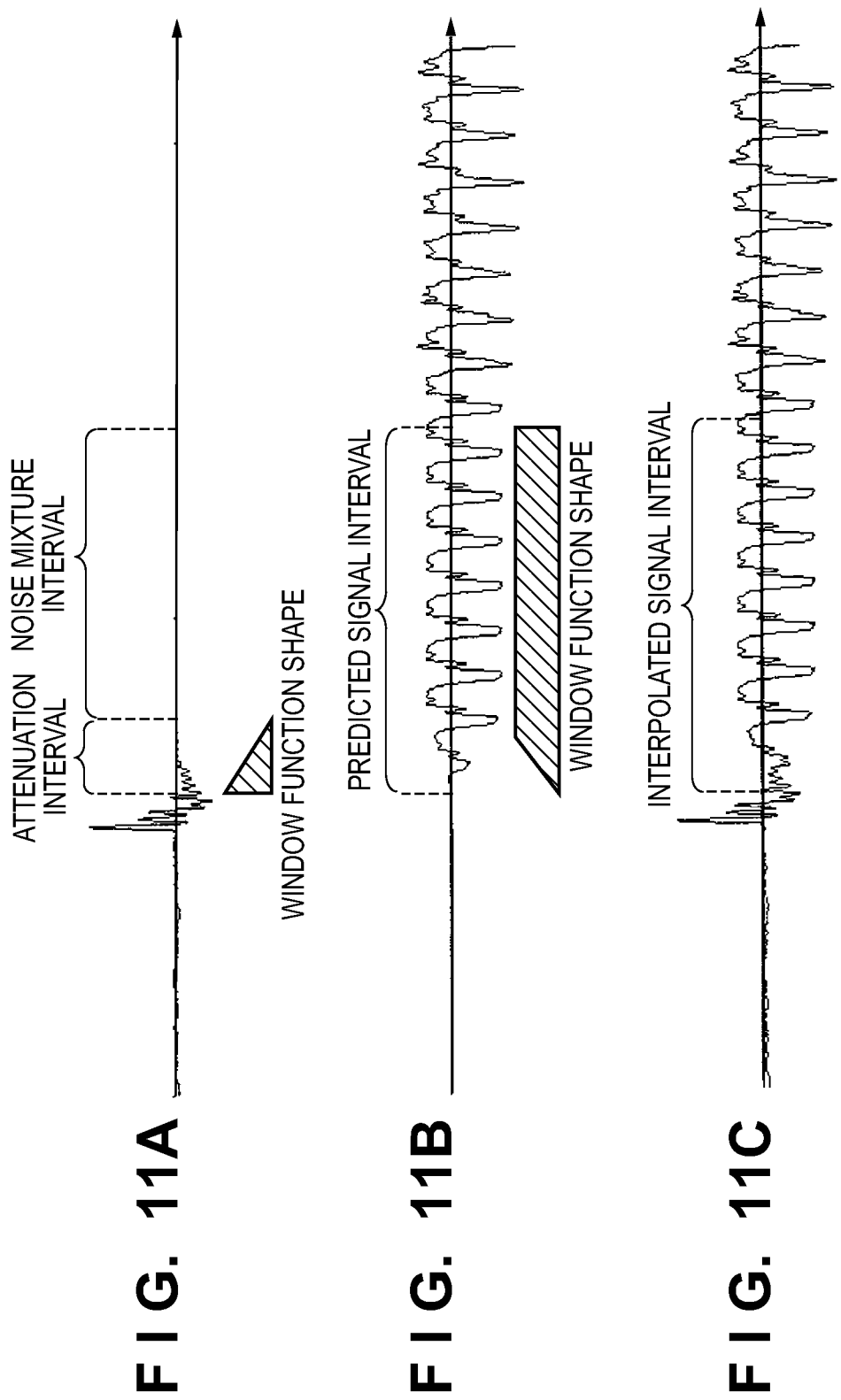

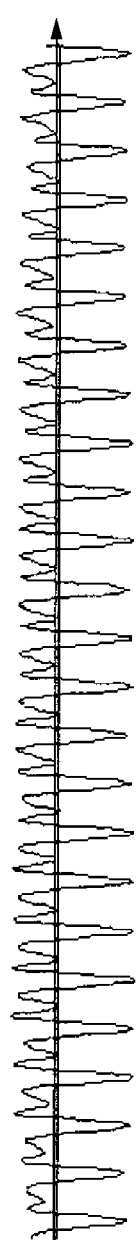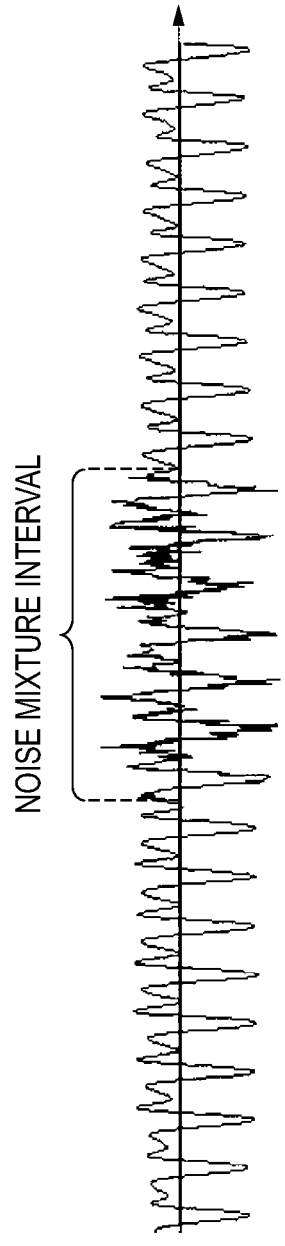
F I G. 18A
F I G. 18B

AUDIO PROCESSING APPARATUS, AUDIO PROCESSING METHOD AND IMAGING APPARATUS

BACKGROUND OF THE INVENTION

1. Field of the Invention

The present invention relates to an audio processing apparatus, an audio processing method, and an imaging apparatus.

2. Description of the Related Art

Conventionally, some digital cameras are known to record sounds, and have a function of moving image capture which accompanies audio signal recording, in addition to still image capture. In such a camera, when a driver of, for example, a focus lens or a diaphragm mechanism is operated during moving image capture, a driving sound generated by the driver mixes in with an audio signal as noise upon recording.

Japanese Patent Laid-Open No. 2008-077707 relates to a technique for removing driving noise in a storage device of a video camera. This patent literature discloses processing of predicting a sound which contains no noise in a driving noise mixture interval from audio signals in intervals preceding and succeeding the driving noise mixture interval, and replacing the detected data with the predicted data. This processing uses a technique of interpolating an audio signal in a driving noise mixture interval by predicting succeeding audio signals from immediately preceding audio signals, based on the periodicity of the audio signals.

However, in the conventional technique, when the periodicity of the audio signals in the intervals preceding and succeeding the noise mixture interval is low, the audio prediction accuracy is poor.

FIG. 18A illustrates an example of an audio signal waveform generated when one adult woman utters the Japanese syllable "a," and FIG. 18B illustrates an example of an audio signal waveform generated when driving noise has mixed in with the signal shown in FIG. 18A. Since the audio signal waveform shown in FIG. 18A has a very high periodicity, it can easily be predicted and interpolated from audio signals in intervals preceding and succeeding a noise mixture interval even if noise has mixed in with it, as in the case of FIG. 18B.

On the other hand, FIG. 19A illustrates an example of an audio signal waveform generated when the same adult woman utters the Japanese syllable "ka," and FIG. 19B illustrates an example of an audio signal waveform generated when driving noise has mixed in with the audio signal shown in FIG. 19A in an interval immediately succeeding the consonant interval of this audio signal upon lens driving. The consonant interval immediately preceding a noise mixture interval is not repeated more than once in the noise mixture interval and the interval immediately preceding the noise mixture interval, and therefore has a very low periodicity. At this time, when prediction processing is performed in the same way as in the conventional technique, an audio signal representing the consonant portion, or a signal representing a sound totally different from the sound actually uttered by the woman in the noise mixture interval may be interpolated for the noise mixture interval.

Also, when a noise mixture interval is determined in accordance with the drive command timing of an imaging lens driver, and prediction processing is performed for this noise mixture interval, the following problem may be posed.

FIG. 20 illustrates an example of an audio signal waveform when friction noise is generated as the operator touched an imaging apparatus immediately before generation of driving noise upon driving of the imaging lens driver, which is to undergo noise removal processing. Sounds other than the driving noise and friction noise are identical to those of the object sound shown in FIG. 18A. As shown in FIG. 20, when another noise is generated as, for example, the operator scratches the apparatus surface immediately before driving of the imaging lens driver, friction noise generated immediately before the noise mixture interval is used in predicting an audio signal in the noise mixture interval in the conventional technique. Hence, a discordant sound is produced after noise removal processing.

SUMMARY OF THE INVENTION

The present invention provides an apparatus capable of executing, for example, noise reduction processing corresponding to a collected sound.

According to one aspect of the present invention, there is provided an audio processing apparatus comprising: an obtaining unit configured to obtain an audio signal; and a processor configured to process the audio signal; wherein the processor detects a period which contains noise in the audio signal, wherein the processor generates a first predicted signal based on an audio signal in a period preceding the detected period, and generates a second predicted signal based on an audio signal in a period succeeding the detected period, wherein the processor combines the first predicted signal and the second predicted signal based on a ratio between a periodicity of the audio signal in the period preceding the detected period, and a periodicity of the audio signal in the period succeeding the detected period, and wherein the processor replaces the audio signal in the detected period with the combined signal.

Further features of the present invention will become apparent from the following description of exemplary embodiments with reference to the attached drawings.

BRIEF DESCRIPTION OF THE DRAWINGS

FIGS. 4A to 4G are waveform charts for explaining audio prediction processing in the first embodiment;

FIG. 5 is a flowchart of a recording operation in the first embodiment;

FIGS. 6A to 6C are waveform charts for explaining audio prediction processing in the first embodiment;

FIG. 8 is a waveform chart for explaining noise interval interpolation determination processing in the first embodiment;

FIGS. 9A to 9C are waveform charts for explaining interpolation processing in the first embodiment;

FIGS. 11A to 11C are waveform charts for explaining the interpolation processing in the first embodiment;

FIGS. 18A and 18B are waveform charts illustrating an example of audio signal waveforms upon driving noise mixture;

DESCRIPTION OF THE EMBODIMENTS

First Embodiment

Figure 1:
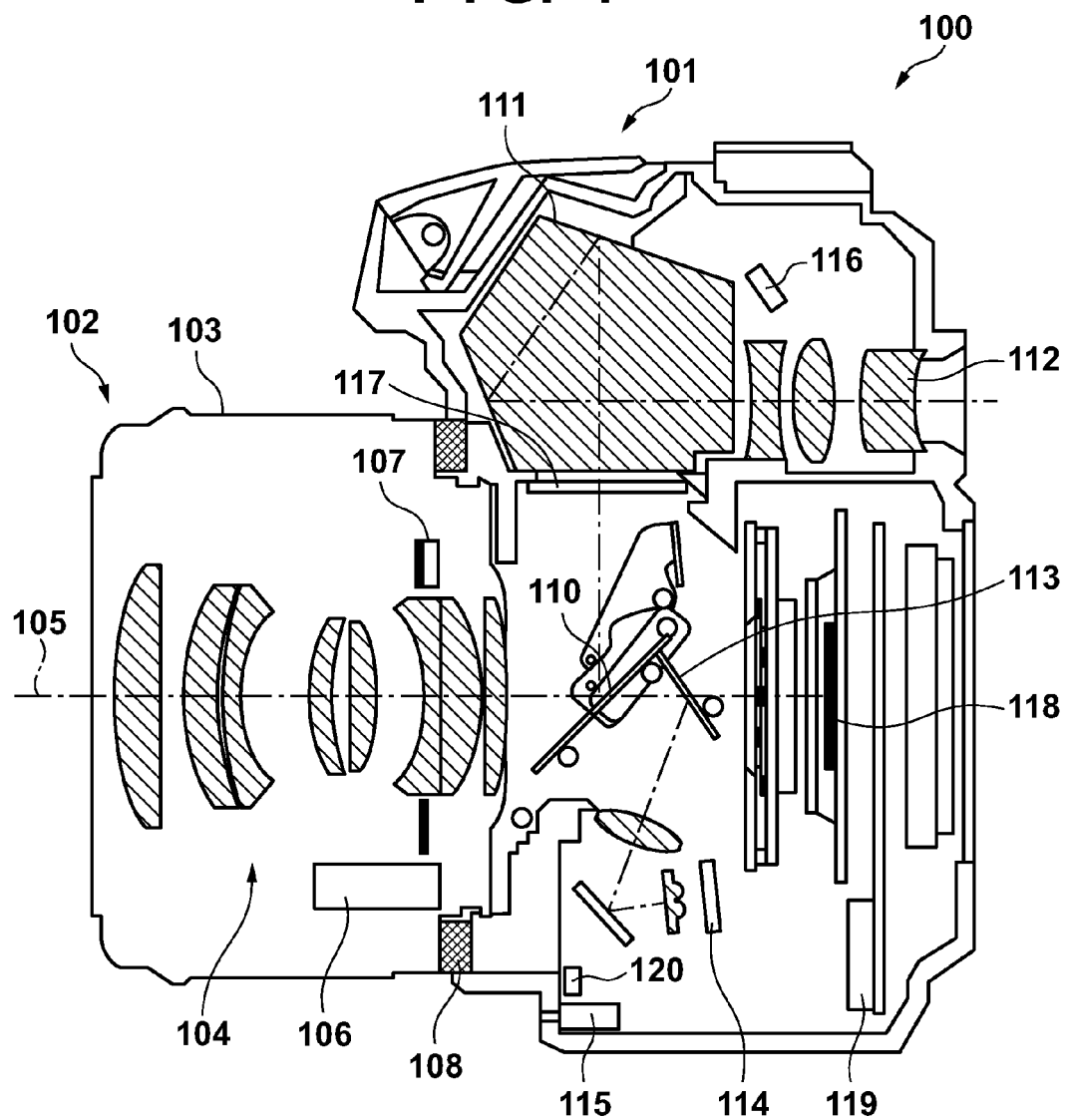
FIG. 1 is a sectional view of a single-lens reflex digital camera in the first embodiment.

FIG. 1 is a sectional view of a single-lens reflex digital camera 100 in the first embodiment. Referring to FIG. 1, reference numeral 101 denotes the camera body of the single-lens reflex digital camera 100; and 102, an imaging lens. The imaging lens 102 includes an imaging optical system 104 having an optical axis 105 in a lens barrel 103. The imaging lens 102 also includes a lens driver 106 which drives focus lenses included in the imaging optical system 104, a camera shake correction lens unit, and a diaphragm mechanism, and a lens controller 107 which controls the lens driver 106. The imaging lens 102 is electrically connected to the camera body 101 via a lens mount contact 108.

Light bearing the information of an object optical image, which is incident from the front side of the imaging lens 102, enters the camera body upon passing through the optical axis 105, and is partially reflected by a main mirror 110 implemented by a half mirror to form an image on a focusing screen 117. The optical image formed on the focusing screen 117 is visually recognized from an eyepiece window 112 through a pentaprism 111. A photometric sensor 116 serving as an exposure detector detects the brightness of the optical image formed on the focusing screen 117. A component of the light bearing the information of the object optical image, which is transmitted through the main mirror 110, is reflected by a sub-mirror 113, enters a focus detector 114, and is used for the focus detection arithmetic operation of the object image.

When a release button (not shown) in the camera body 101 is operated to issue an image capture start command, the main mirror 110 and sub-mirror 113 retract from the image capture optical path so that the light which bears the information of the object optical image enters an image sensor 118. Light beams incident on the focus detector 114, photometric sensor 116, and image sensor 118, respectively, are converted into electrical signals, and sent to a camera controller 119 to control the camera system. Also, in moving image capture, a sound uttered by the object is input from a microphone 115, sent to the camera controller 119, and recorded in synchronism with a signal of the light bearing the information of the object optical image, which is incident on the image sensor 118. Reference numeral 120 denotes an accelerometer serving as a vibration detector. The accelerometer 120 is set on the inner side surface of the camera body 101 near the microphone 115. The accelerometer 120 detects vibration which is generated when the lens driver 106 drives mechanisms including the focus lenses, camera shake correction lens unit, and diaphragm mechanism, and propagates through the imaging lens 102 and camera body 101. The camera controller 119 analyzes the vibration detection result to calculate a noise mixture interval.

Figure 2:
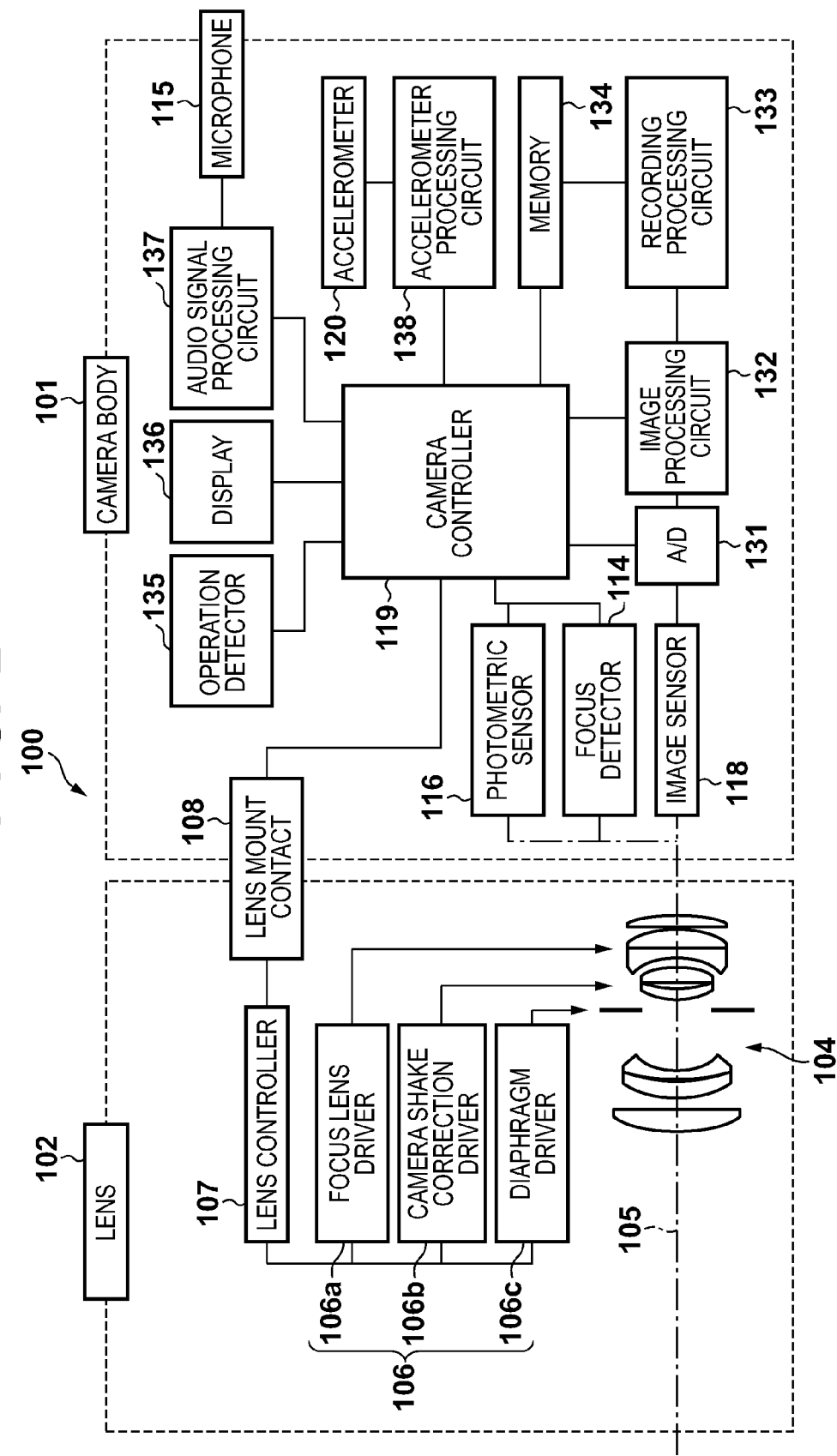
FIG. 2 is a block diagram showing the configuration of the single-lens reflex digital camera in the first embodiment.

FIG. 2 is a block diagram for explaining electrical control of the single-lens reflex digital camera 100. The single-lens reflex digital camera 100 includes an imaging system, image processing system, audio processing system, recording/playback system, and control system. The imaging system includes the imaging lens 102 and image sensor 118. The image processing system includes an A/D converter 131 and image processing circuit 132. The audio processing system includes the microphone 115 and an audio signal processing circuit 137. The recording/playback system includes a recording processing circuit 133 and memory 134. The control system includes the camera controller 119, the focus detector 114, the photometric sensor 116, an operation detector 135, the lens controller 107, and the lens driver 106. The lens driver 106 includes a focus lens driver 106a, camera shake correction driver 106b, and diaphragm driver 106c.

The imaging system serves as an optical processing system which forms an image of light from an object on the imaging surface of the image sensor 118 through the imaging optical system 104. During an image capture preliminary operation such as aiming, the light beam is also partially guided to the focus detector 114 through a mirror set in the main mirror 110. As will be described later, by appropriately adjusting the imaging optical system by the control system, the image sensor 118 is exposed to an appropriate amount of object light, and an object image is formed near the image sensor 118.

The image processing circuit 132 serves as a signal processing circuit which processes an image signal corresponding to the image sensor pixel count received from the image sensor 118 via the A/D converter 131. The image processing circuit 132 includes, for example, a white balance circuit, a gamma correction circuit, and an interpolation arithmetic circuit which increases the resolution by an interpolation arithmetic operation.

In the audio processing system, the audio signal processing circuit 137 performs appropriate processing for a signal input via the microphone 115 to generate a recording audio signal. The recording audio signal is linked with a given image and recorded by a recording processor (to be described later).

The accelerometer 120 is connected to the camera controller 119 via an accelerometer processing circuit 138. The accelerometer processing circuit 138 performs amplification, highpass filter processing, and lowpass filter processing for an acceleration signal of vibration of the camera body 101 detected by the accelerometer 120, thereby detecting target frequencies.

The recording processing circuit 133 outputs an image signal to the memory 134, and generates and stores an image to be output to a display 136. Also, the recording processing circuit 133 compresses and records data of, for example, a still image, a moving image, or a sound using a predetermined method. The recording processing circuit 133 and memory 134 constitute a recorder 303.

The camera controller 119 generates and outputs, for example, a timing signal used in imaging. The focus detector 114 and photometric sensor 116 detect the focus state of the imaging apparatus, and the brightness of the object, respectively. The lens controller 107 appropriately drives the lenses in accordance with the signal from the camera controller 119 to adjust the optical system.

The control system interlocks with external operations to control the imaging system, image processing system, and recording/playback system. For example, when the operation detector 135 detects a press of a shutter release button (not shown), the camera controller 119 controls, for example, the driving of the image sensor 118, the operation of the image processing circuit 132, and the compression processing of the recording processing circuit 133, in response to the detected operation. The camera controller 119 also controls display on the display 136 implemented by, for example, an optical viewfinder or a liquid crystal monitor.

The adjustment operation of the optical system of the control system will be described below. The camera controller 119 is connected to the focus detector 114 and the photometric sensor 116 serving as an exposure detector, and obtains an appropriate focal position and diaphragm position based on signals generated by these detectors. The camera controller 119 issues a command associated with the obtained focal position and diaphragm position to the lens controller 107 via the lens mount contact 108 to appropriately control the focus lens driver 106a and diaphragm driver 106c. The lens controller 107 is connected to a camera shake detection sensor (not shown), and appropriately controls the camera shake correction driver 106b based on a signal generated by the camera shake detection sensor in a camera shake correction mode. In moving image capture, the main mirror 110 and sub-mirror 113 retract from the optical path through which light is guided from the optical axis 105 to the image sensor 118, so the light which bears the information of the object optical image enters neither the focus detector 114 nor the photometric sensor 116. Hence, the camera controller 119 adjusts the amount of driving of the focus lens driver 106a, and the focus state of the imaging optical system using a contrast focus detector, that is, a so-called hill climbing focus detector which uses continuous image information obtained by exposure of the image sensor 118 to light. The camera controller 119 also adjusts the diaphragm state by calculating the brightness of the object image using the image information obtained by exposure of the image sensor 118 to light.

Noise removal processing (noise reduction processing) by audio prediction in this embodiment will be described below with reference to FIGS. 3 and 4A to 4G. In the noise removal processing of this embodiment, an audio signal which interpolates an audio signal in a driving noise mixture period is generated using audio signals in intervals preceding and/or succeeding the driving noise mixture period.

Figure 3:
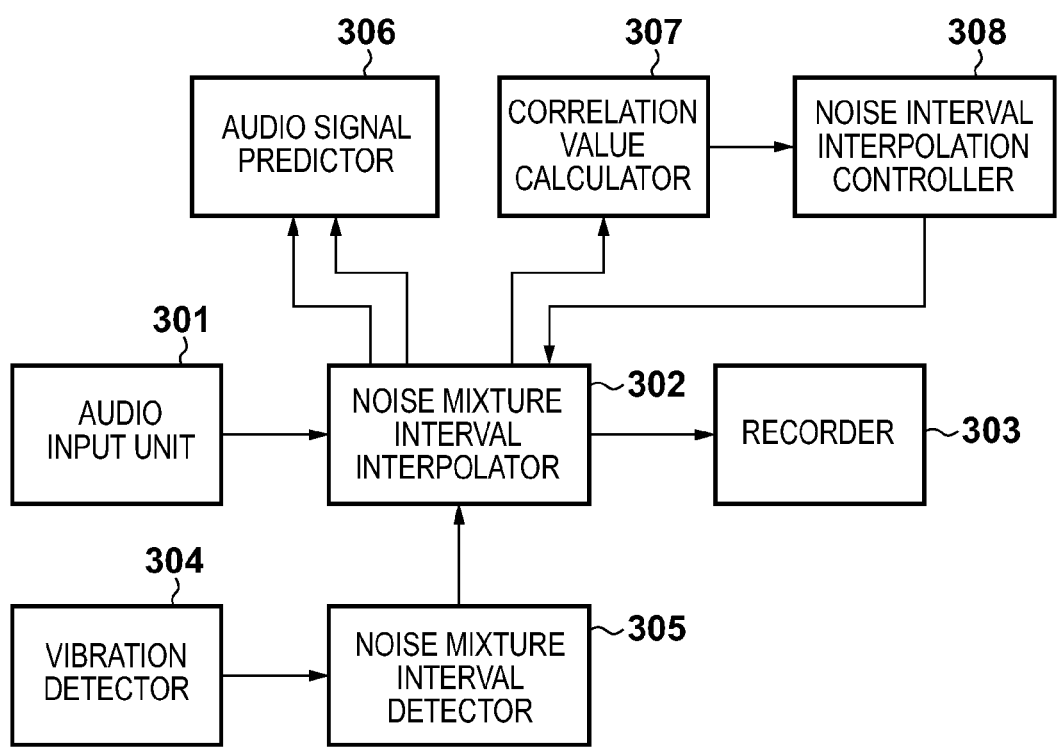
FIG. 3 is a block diagram showing a functional configuration associated with noise removal processing in the first embodiment.

FIG. 3 is a block diagram showing the functional configuration of the audio signal processing circuit 137 associated with noise removal processing. The microphone 115 serving as an audio input unit 301 obtains an audio signal. The audio signal obtained at this time may contain driving noise of the lens driver 106. A vibration detector 304 is implemented by the accelerometer 120, and detects vibration upon driving of the lens driver 106. A noise mixture interval detector 305 analyzes a signal from the accelerometer 120 to detect an accurate noise mixture interval.

A correlation value calculator 307 calculates the correlation between audio signals in intervals immediately preceding and succeeding the noise mixture interval, in order to determine whether the periodicity of these audio signals is high. An audio signal predictor 306 calculates a predicted audio signal in the noise mixture interval based on the audio signals in the intervals preceding and succeeding the noise mixture interval, and their correlation values. The generation of a predicted audio signal will be described in detail later. A noise interval interpolation controller 308 determines whether the predicted audio signal is to be used for interpolation, based on the level of the periodicity of the audio signals represented by the calculated correlation values, thereby controlling audio signal interpolation which uses the predicted audio signal by a noise mixture interval interpolator 302. The noise mixture interval interpolator 302 interpolates an audio signal in the noise mixture interval detected by the noise mixture interval detector 305, in accordance with a control signal from the noise interval interpolation controller 308. The recorder 303 records the audio signal interpolated by the noise mixture interval interpolator 302 in the memory 134 via the recording processing circuit 133.

Audio prediction processing by the audio signal predictor 306 will be described below. FIGS. 4A to 4G illustrate signals in respective steps of prediction processing for the obtained audio signal. FIGS. 4A to 4G show time on the abscissa. FIG. 4C shows the correlation value on the ordinate. FIGS. 4A, 4B, and 4D to 4G show the signal level on the ordinate.

FIG. 4A illustrates a signal generated when diaphragm driving noise has mixed in the object audio signal, FIG. 4B illustrates an audio signal in a correlation value reference interval in which pitch detection is performed, and FIG. 4C illustrates a correlation value obtained from audio signals in the correlation value reference interval and correlation value calculation interval, and a pitch detected based on the correlation value. Note that the correlation value reference interval is, for example, for 0.01 sec before, for example, the noise mixture interval, and the correlation calculation interval is, for example, for 0.05 sec before, for example, the noise mixture interval. FIG. 4D illustrates a predicted signal generated so as to interpolate the audio signal in the noise mixture interval using the detected pitch, and FIG. 4E illustrates the product of the predicted signal, and a triangular window function shown in FIG. 4D. FIG. 4F similarly illustrates the product of the audio prediction result obtained in an interval succeeding the noise mixture interval, and a window function shown in FIG. 4F, and FIG. 4G illustrates the result of interpolating the audio signal in the noise mixture interval by adding the audio prediction results obtained in the intervals preceding and succeeding the noise mixture interval, shown in FIGS. 4E and 4F, respectively. An audio signal obtained earlier than noise generation will be referred to as a preceding audio signal hereinafter, and an audio signal obtained later than the noise generation will be referred to as a succeeding audio signal hereinafter.

In prediction processing, first, the noise mixture interval detector 305 detects the noise mixture interval shown in FIG. 4A. Alternatively, the noise mixture interval detector 305 can analyze the frequency of a sound mixed with noise to calculate a noise mixture interval using characteristic frequency components of driving noise, or detect a noise mixture interval by obtaining a timing to issue a drive command to the lens driver 106.

To generate audio predicted signals in the noise mixture interval from audio signals in intervals preceding and succeeding the noise mixture interval by the audio signal predictor 306, a repetition pitch is detected from the correlation value of an audio signal in an interval immediately preceding the noise mixture interval. The audio signal has a relatively high periodicity when attention is focused on a region in a short period of time, as shown in FIG. 4A. Using this fact, the audio signal in the interval immediately preceding the noise mixture interval is repeatedly reproduced to generate predicted signals for interpolating the audio signal in the noise mixture interval. FIG. 4C illustrates a correlation value calculated from the signal in the correlation value reference interval and the signal in the correlation value calculation interval, shown in FIG. 4A, by the correlation value calculator 307. The correlation value calculator 307 obtains the correlation value by adding the product of the values of the audio signal at respective times in the correlation value reference interval, and that of the values of the audio signal at respective times in the correlation value calculation interval. Further, the audio signal waveform in the correlation value reference interval is sequentially shifted relative to the audio signal in the correlation value calculation interval, and calculated at each shifted position, thereby obtaining a correlation value as shown in FIG. 4C. The position (time length) at which the correlation value maximizes from the time immediately before the noise mixture interval in the audio signal becomes the audio repetition pitch. However, the correlation value maximizes at the position at which the correlation value reference interval is temporally synchronized with the correlation value calculation interval, that is, the position at which the amount of shift in correlation calculation is zero. Therefore, a maximum correlation value search interval shown in FIG. 4C, which is spaced apart from a noise removal interval by a distance corresponding to a pitch threshold interval, is searched for the maximum value of the correlation value. The pitch threshold interval is desirably the reciprocal of the maximum value of the fundamental frequency of a sound to be recorded. This prevents erroneous detection of a pitch shorter than the audio repetition pitch to be obtained. For example, the pitch threshold interval is desirably set to 2.5 msec because the fundamental frequency of the Japanese is about 400 Hz or less.

The audio signal predictor 306 generates a predicted signal repeated until the audio signal in the detected pitch interval reaches the terminal end of the prediction interval, as shown in FIG. 4D. The predicted signal in this step will be referred to as a "predicted signal before window multiplication" hereinafter. The audio signal predictor 306 then multiplies the generated predicted signal before window multiplication by a triangular window function to complete a preceding predicted signal, as shown in FIG. 4E. The predicted signal in this step will be referred to as a "predicted signal after window multiplication" hereinafter. At this time, when the number of data in the prediction interval is (N+1), a window function wf(t) is wf(n)=(N−n)/N, assuming that the number of data immediately after the start of prediction is n=0.

The audio signal predictor 306 also performs the same processing for the time immediately after the noise mixture interval to generate a succeeding predicted signal after window multiplication, as shown in FIG. 4F. A triangular window function wr(n) which is multiplied with a succeeding predicted signal before window multiplication is wr(n)=n/N, which is symmetrical with respect to the preceding predicted signal before window multiplication.

The noise mixture interval interpolator 302 adds the preceding predicted signal after window multiplication and the succeeding predicted signal after window multiplication, and replaces and thereby interpolates the audio signal in the noise mixture interval with the obtained audio predicted signal. FIG. 4G illustrates an example of the signal waveform obtained as the interpolation result. By multiplying the preceding and succeeding predicted signals before window multiplication by the respective triangular window functions, and adding the obtained products to each other, audio signals can be smoothly connected to each other in the connection portion between the preceding predicted signal and the audio signal in the interval immediately succeeding the noise mixture interval, and the connection portion between the succeeding predicted signal and the audio signal in the interval immediately preceding the noise mixture interval. Although predicted signals are generated using the audio signals in the intervals immediately preceding and succeeding the noise mixture interval in the above description, the present invention is not limited to the intervals "immediately preceding and succeeding the noise mixture interval" in this embodiment. For example, a predicted signal may be generated using an audio signal in an interval of 0.01 to 0.11 sec before the noise mixture interval, or generated using an audio signal in an interval of 0.01 to 0.11 sec after the noise mixture interval.

Although FIGS. 4A to 4G illustrate an example in which driving noise has mixed in an audio signal while the woman utters the Japanese syllable "a," the case wherein the same prediction processing is performed when another audio signal is generated will be described below.

Noise removal processing in this embodiment will be described with reference to a flowchart shown in FIG. 5, and explanatory views shown in FIGS. 6A to 6C and 7A to 7F.

When an image capture operation starts, a recording operation starts at the same time. First, in step S1001, the camera controller 119 determines whether a drive command has been issued to the lens driver 106. If no drive command to the lens driver 106 is detected in step S1001, the process advances to step S1012. Unless OFF of an image capture operation switch is detected in step S1012, the process returns to step S1001, in which given processing is repeated.

When the lens driver 106 is activated, its driving sound may mix in an audio signal as noise. Hence, if a lens drive command is detected in step S1001, in step S1002 the noise mixture interval detector 305 uses a signal from the accelerometer 120 serving as the vibration detector 304 to detect vibration upon lens driving, thereby accurately detecting a noise mixture interval. Note that it is also possible to monitor the time at which a command is issued from the camera controller 119 to the lens driver 106, thereby calculating a noise mixture interval. However, it is desired to use an accelerometer in terms of accurate detection because of, for example, a time lag from the issuance timing of a lens drive command to the driving timing of the lens driver 106.

In step S1003, the correlation value calculator 307 obtains the correlation values of the correlation value reference interval and correlation value calculation interval, as illustrated in FIGS. 4A to 4C mentioned above, in the intervals immediately preceding and succeeding the noise mixture interval. Let $cor\_f(\tau)$ be the correlation value obtained using an audio signal in an interval immediately preceding the noise mixture interval, and $cor\_r(\tau)$ be the correlation value obtained using an audio signal in an interval immediately succeeding the noise mixture interval. $\tau$ is the amount of shift of the correlation reference interval.

In step S1004, the correlation value calculator 307 detects a pitch used for predicted signals, from the correlation values $cor\_f(\tau)$ and $cor\_r(\tau)$, as shown in FIG. 4C. In step S1005, the correlation value calculator 307 normalizes the correlation values $cor\_f(\tau)$ and $cor\_r(\tau)$ calculated in step S1003, and calculates maximum correlation values after normalization.

Normalization of the correlation value of an audio signal in an interval preceding the noise mixture interval, and calculation of a maximum correlation value will be described with reference to FIGS. 6A to 6C. FIG. 6A is a schematic view of an audio signal generated when one adult woman utters the Japanese syllable "a," and FIG. 6B is a schematic view of an audio signal as a noise mixture interval signal is omitted from the audio signal shown in FIG. 6A. FIG. 6C is a schematic view of an audio signal obtained by normalizing correlation values obtained from audio signals in the correlation value reference interval and correlation value calculation interval immediately preceding the noise mixture interval, and shows a position synchronous with that of the audio signal shown in FIG. 6A. As can be seen from the above-mentioned pitch detection method, the correlation value maximizes at the position at which the amount of audio signal shift τ in the correlation value reference interval during correlation value calculation is zero, so the correlation value cor_f(τ) is divided by the maximum correlation value and thereby normalized. Hence, the correlation value is 1 when τ=0 upon normalization. When the maximum value of the correlation value after normalization is detected in the same way as in the pitch detection operation, a maximum correlation value cor_f_max after normalization is derived by:

$$cor\_f\_max = cor\_f(\tau p)/cor\_f(0) \qquad (1)$$

where τp is the amount of shift of the pitch detection position.

Similarly, a maximum correlation value cor_r_max in an interval immediately succeeding the noise mixture interval is calculated.

In step S1006, the noise interval interpolation controller 308 determines whether both the maximum correlation values cor_f_max and co_r r_max calculated in step S1005 are higher than a correlation threshold Tc. If both the maximum correlation values cor_f_max and cor_r_max are higher than the correlation threshold Tc, the periodicities of the audio signals in the intervals preceding and succeeding the noise mixture interval are determined to be high, and considered as suitable for use in prediction processing. The correlation threshold Tc is set to an appropriate value less than 1, depending on, for example, the time length of the correlation value reference interval, and the antinoise performance of the microphone 115 serving as an audio input unit.

If it is determined in step S1006 based on the maximum correlation values that the periodicities of both the audio signals in the intervals preceding and succeeding the noise mixture interval are high, the process advances to step S1007. In step S1007, the audio signal predictor 306 generates audio predicted signals in the noise mixture interval from the audio signals in the intervals preceding and succeeding the noise mixture interval using the pitch detected in step S1004, as shown in FIGS. 4D to 4F. The audio signal predictor 306 then multiplies the preceding and succeeding audio predicted signals by respective triangular window functions, and adding the obtained products to each other, thereby completing an audio predicted signal. The noise mixture interval interpolator 302 replaces the audio signal in the noise mixture interval with the audio predicted signal, as shown in FIG. 4G. The replaced audio signal is recorded in the memory 134, and the process advances to step S1012.

On the other hand, if it is determined in step S1006 that at least one of the maximum correlation values cor_f_max and cor_r_max is lower than the correlation threshold Tc, the process advances to step S1008. In step S1008, the noise interval interpolation controller 308 determines whether only the preceding maximum correlation value cor_f_max is lower than the correlation threshold Tc. If it is determined in step S1008 that only the preceding maximum correlation value cor_f_max is lower than the correlation threshold Tc, this means that the periodicity of the audio signal in the interval immediately preceding the noise mixture interval is low, and the process advances to step S1009. In step S1009, the noise mixture interval interpolator 302 interpolates the audio signal in the noise mixture interval using the succeeding audio predicted signal.

Figure 7A:
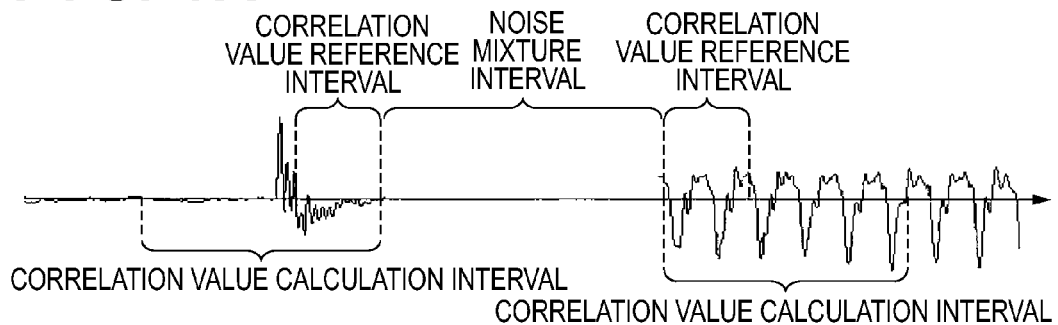
FIGS. 7A to 7F are waveform charts for explaining audio prediction processing in the first embodiment.
Figure 7B:
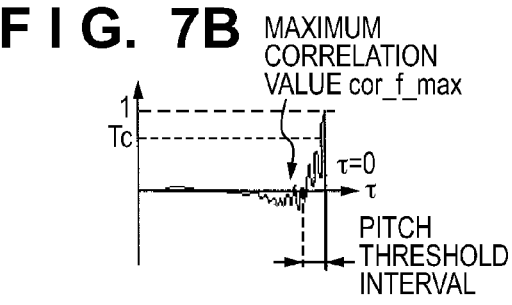
Figure 7C:
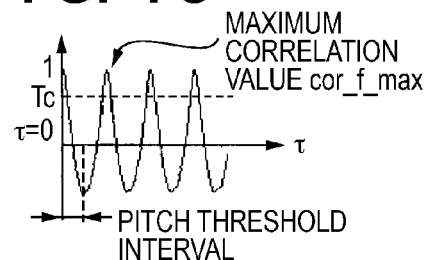

FIG. 7A illustrates an example of an audio signal waveform generated when one adult woman utters the Japanese syllable "ka." However, an audio signal in a noise mixture interval is not illustrated in FIG. 7A. FIG. 7B illustrates an audio signal obtained by normalizing a correlation value cor_f(τ) calculated from an audio signal in an interval immediately preceding the noise mixture interval of the audio signal shown in FIG. 7A, and FIG. 7C illustrates an audio signal obtained by normalizing a correlation value cor_r(τ) calculated from an audio signal in an interval immediately succeeding the noise mixture interval of the audio signal shown in FIG. 7A. The audio signal in the interval immediately preceding the noise mixture interval exhibits an audio signal waveform with a low periodicity because it contains a consonant portion, as shown in FIG. 7A. Also, the correlation value cor_f(τ) considerably decreases with only a small change in amount of shift τ from zero, and the maximum correlation value cor_f_max is lower than the correlation threshold Tc, as shown in FIG. 7B. On the other hand, the periodicity of the audio signal in the interval immediately succeeding the noise mixture interval is high, and the maximum correlation value cor_r_max is equal to or higher than the correlation threshold Tc, as shown in FIG. 7B. Hence, in this case, the audio signal in the noise mixture interval is interpolated using only an audio predicted signal generated from the audio signal in the interval succeeding the noise mixture interval without an audio predicted signal generated from the audio signal in the interval preceding the noise mixture interval.

Figure 7D:
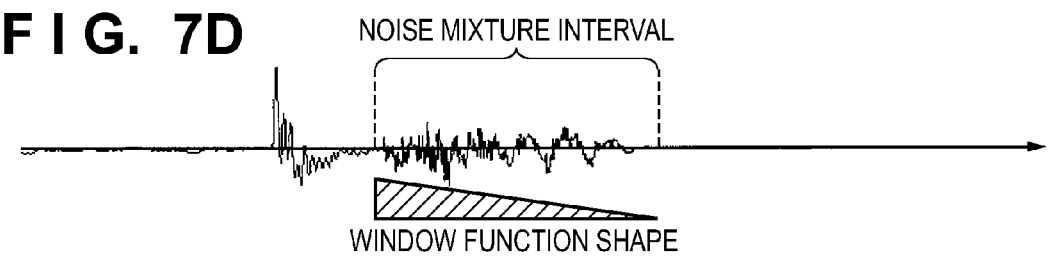
Figure 7E:
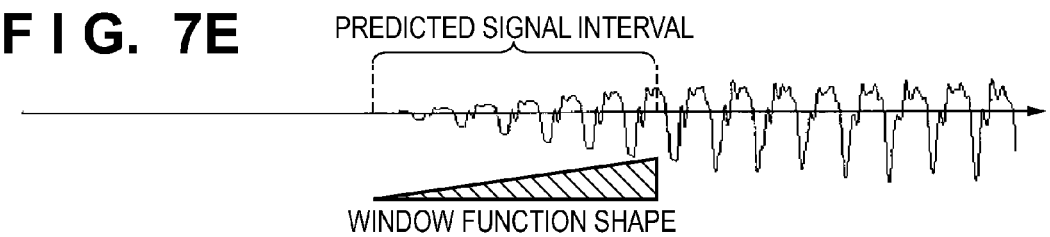
Figure 7F:
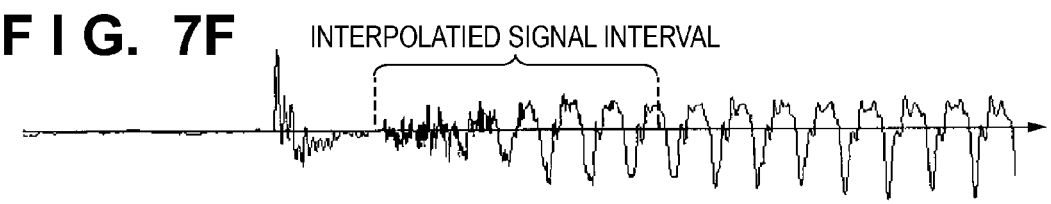

FIG. 7D is a waveform chart illustrating the waveform of an audio signal in an interval preceding the noise mixture interval, and that of an audio signal obtained by multiplying the signal in the noise mixture interval by a triangular window function. Noise components in the noise mixture interval reduce in more succeeding intervals because of the multiplication by the triangular window function. FIG. 7E is a waveform chart illustrating the waveform of an audio signal in an interval succeeding the noise mixture interval, and that of an audio signal obtained by multiplying an audio predicted signal obtained from the audio signal in the interval succeeding the noise mixture interval by a triangular window function. The triangular window function which is multiplied with the audio predicted signal obtained from the audio signal in the interval succeeding the noise mixture interval has a shape symmetrical about that of the triangular window function which is multiplied with the audio signal in the noise mixture interval in FIG. 7D. The noise mixture interval interpolator 302 replaces the audio signal in the noise mixture interval with an audio predicted signal obtained by adding the signals multiplied by the window functions, respectively, as shown in FIG. 7F. The replaced signal is recorded in the memory 134.

In the processing of step S1009, the noise removal performance may be lower than that in the noise removal processing of step S1007. Nevertheless, the audio signal generated upon the processing in step S1009 is less discordant than the audio predicted signal generated from an audio signal with a low periodicity in the interval preceding the noise mixture interval, as in the conventional technique. When the audio signal is interpolated using the audio predicted signal in the interval succeeding the noise mixture interval in step S1009, the process advances to step S1012.

On the other hand, if it is determined in step S1008 that the maximum correlation value cor_f_max is equal to or higher than the correlation threshold Tc, or the maximum correlation value cor_r_max is lower than the correlation threshold Tc, the process advances to step S1010. In step S1010, the noise interval interpolation controller 308 determines whether only the succeeding maximum correlation value cor_r_max is lower than the correlation threshold Tc. If it is determined in step S1010 that only the succeeding maximum correlation value cor_r_max is lower than the correlation threshold Tc, this means that the periodicity of the audio signal in the interval immediately succeeding the noise mixture interval is low, and the process advances to step S1011. In step S1011, the noise mixture interval interpolator 302 interpolates the audio signal in the noise mixture interval using the audio predicted signal in the interval immediately preceding the noise mixture interval. An interpolation operation will not be described hereinafter.

On the other hand, if it is determined in step S1010 that both the maximum correlation values cor_f_max and cor_r_max are lower than the correlation threshold Tc, this means that the periodicities of both the audio signals in the intervals preceding and succeeding the noise mixture interval are low. In this case, the process advances to step S1012 without interpolation in the noise mixture interval using the audio predicted signal. In this case, the driving noise remains in the recorded audio signal, but nonetheless a less discordant audio signal can be produced, compared to an audio signal obtained by interpolation using a predicted audio signal obtained from an audio signal with a low periodicity. Note that in this case, interpolation may be done by generating a predetermined audio signal (for example, an audio signal representing silence) as a signal for interpolating the audio signal in the noise mixture interval.

If OFF of the image capture operation switch is detected in step S1012, the recording operation ends.

As described above, in this embodiment, prediction processing is performed based on an audio signal in an interval preceding or succeeding a noise mixture interval, and an audio signal in the noise mixture interval is interpolated using an audio predicted signal. Note that if it is determined based on the correlation value of an audio signal in an interval immediately preceding or succeeding the noise mixture interval that the periodicity of the audio signal waveform is low, the use of the audio predicted signal in interpolation is inhibited. This makes it possible to prevent a discordant audio predicted signal generated upon prediction processing from an audio signal with a low periodicity from being used in interpolation. Note that an example in which only an audio predicted signal based on an audio signal having a periodicity higher than a predetermined value is used without an audio predicted signal based on an audio signal having a periodicity lower than the predetermined value has been given in this embodiment. However, the shape of the triangular window function may be changed so that the ratio of an audio predicted signal based on an audio signal having a periodicity lower than a predetermined value becomes lower than that of an audio predicted signal based on an audio signal having a periodicity higher than the predetermined value. When, for example, the periodicity of the preceding audio signal is high, while the periodicity of the succeeding audio signal is low, a triangular window function the level of which decreases from 1 to 0.4 is used for an audio predicted signal based on the preceding audio signal, while a triangular window function the level of which increases from 0 to 0.6 is used for an audio predicted signal based on the succeeding audio signal.

In this embodiment, the noise interval interpolation controller 308 determines whether the maximum correlation value after the correlation value is normalized by the correlation value calculator 307 is higher than the correlation threshold Tc to determine the periodicity of the audio signals in the intervals immediately preceding and succeeding the noise mixture interval. However, the present invention is not limited to this mode. For example, this periodicity may be determined using a method which employs the following predicted signal result comparator.

FIG. 8 is a schematic waveform chart of an audio signal obtained when pitch detection is performed in an interval preceding the noise mixture interval in step S1004. The abscissa indicates time t, and the ordinate indicates the signal level y(t). Let tn be the start position of the noise mixture interval, and tn-tm be the detected pitch length (first interval). Letting tl be the position the detected pitch length before the start position tm of the detected pitch, the interval from tl to tm (second interval) is defined as a determined pitch. When the level of correlation between the first and second intervals adjacent to an interval immediately preceding the noise mixture interval is high, the audio signal waveforms in the determined pitch and detected pitch nearly coincide with each other. Hence, based on whether the sum of squares σ of the difference between the determined pitch and the detected pitch is larger than a pitch threshold Tp, the predicted signal result comparator determines the periodicity as:

$$\sigma = \sum_{n=0}^{tn-tm-1} \{y(tm+n) - y(tl+n)\}^2 \quad (2)$$

If the sum of squares σ is lower than the pitch threshold Tp, the periodicity of the audio signal is determined to be low.

Also, if it is determined in step S1008 or S1010 that the periodicity of only one of audio signals in intervals immediately preceding and succeeding the noise mixture interval is low, the following processing is performed in this embodiment. That is, in this case, one audio predicted signal is multiplied by a triangular window function, the other audio predicted signal is multiplied by a triangular window function symmetrical with respect to that in the noise mixture interval, and the obtained products are added to each other, thereby interpolating the audio signal in the noise mixture interval. However, the following window function may be used for multiplication.

FIG. 9A is a schematic waveform chart of an audio signal in an interval preceding the noise mixture interval of the audio signal shown in FIG. 7A, and a signal obtained by multiplying the audio signal in the noise mixture interval by a window function with a shape shown in FIG. 9A. Unlike FIG. 7D, the audio signal is multiplied by a triangular window function with a length corresponding to not the entire noise mixture interval but an attenuation interval shown in FIG. 9A. Like FIG. 7E, FIG. 9B shows an audio signal obtained by multiplying, by a triangular window function, an audio signal that remains the same from an audio signal in an interval succeeding the noise mixture interval, and an audio signal in an interval immediately succeeding the noise mixture interval. The audio signals shown in FIGS. 9A and 9B are added to each other to interpolate the audio signal in the noise mixture interval, as shown in FIG. 9C. In contrast to the multiplication of the audio signal by a triangular window function corresponding to the entire noise mixture interval, the audio signal is multiplied by a triangular window function corresponding to only the attenuation interval in this case, so driving noise components remain less in the interpolated audio signal, thus reducing the influence of the driving noise in terms of audibility.

Figures 10A, 10B:
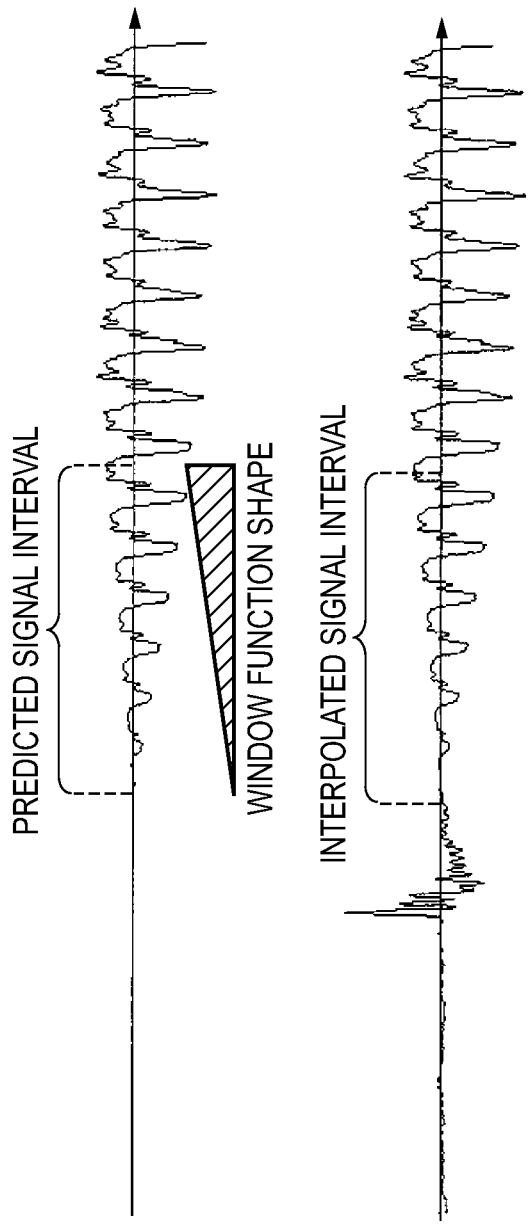
FIGS. 10A and 10B are waveform charts for explaining the interpolation processing in the first embodiment.

It is also possible to interpolate the noise mixture interval by multiplying an audio predicted signal by a triangular window function, as shown in FIGS. 10A and 10B, without multiplying the audio signal in the noise mixture interval by a triangular window function. In this case, the audio signal may become discontinuous in the interval immediately preceding the noise mixture interval, and on the trailing edge of the succeeding predicted signal, thus generating strange noise. It is therefore possible to interpolate the noise mixture interval. FIG. 11A illustrates an audio signal obtained by multiplying an audio signal in an interval preceding the noise mixture interval by a window function in an attenuation interval shown in FIG. 11A. In FIG. 11A, unlike FIG. 9A, the noise mixture interval and the attenuation interval do not overlap each other. FIG. 11B illustrates an audio signal obtained by multiplying a predicted signal in an interval succeeding the noise mixture interval by a window function. In FIG. 11B, unlike FIG. 10B, a predicted signal in an interval longer than the noise mixture interval by the attenuation interval is generated, and the window function has a triangular window shape only in the attenuation interval. The audio signals shown in FIGS. 11A and 11B are added to each other to interpolate the audio signal in the noise mixture interval, and the audio signal in the interval preceding the noise mixture interval by the attenuation interval, as shown in FIG. 11C. In FIGS. 11A and 11B, unlike the example shown in FIGS. 9A to 9C and that shown in FIGS. 10A and 10B, because interpolation is not performed by multiplying a driving noise signal in the noise mixture interval by a window function, no driving noise components remain in the interpolated audio signal at all. This allows noise removal processing that gives less sense of discordance.

Figure 12:
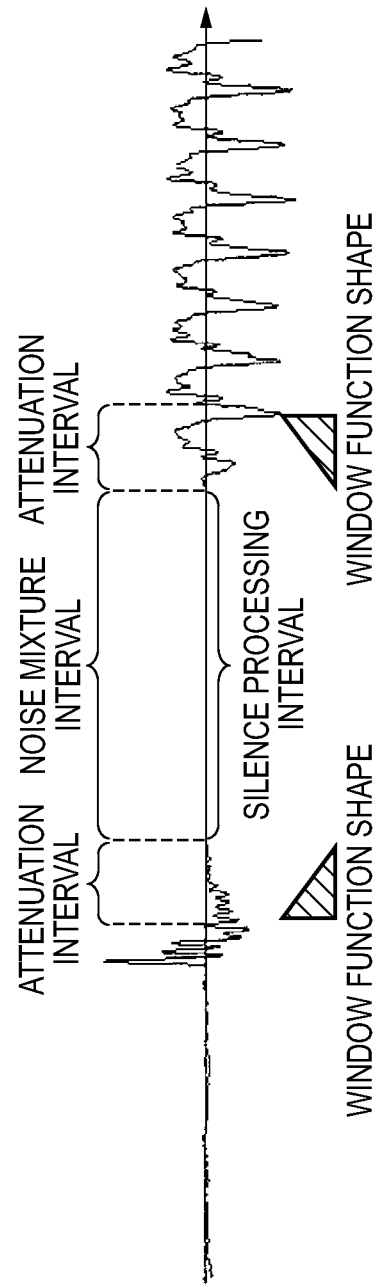
FIG. 12 is a waveform chart for explaining the interpolation processing in the first embodiment.

In this embodiment, if it is determined that the correlation values calculated from audio signals in intervals immediately preceding and succeeding a noise mixture interval are low, and the periodicities of the audio signals are low, a noise mixture signal is recorded intact without interpolation in the noise mixture interval using a predicted audio signal. However, the present invention is not limited to this mode. For example, interpolation may be performed by replacing the audio signal in the noise mixture interval with silence processing (mute), that is, a silence signal. In this case, any driving noise can totally be removed. However, the audio signal may become discontinuous at the terminal end of the noise mixture interval after silence processing, thus generating strange noise. Hence, as shown in FIG. 12, when interpolation is performed by multiplying the audio signals in the intervals preceding and succeeding the noise mixture interval by a window function in an attenuation interval shown in FIG. 12, the audio signal becomes continuous at the terminal end of the noise mixture interval, so a sense of discordance can be reduced.

Further, the noise interval interpolation controller 308 may determine whether interpolation processing which uses silence processing is to be performed, based on the sound pressure level of an audio signal in an interval preceding or succeeding the noise mixture interval. For example, when the sound pressure levels of audio signals in the noise mixture interval and preceding and succeeding intervals, that is, the sound pressure level of an object sound is very high, the audio signal is less discordant even without noise removal processing, as driving noise generated by the lens driver 106 is buried in the object sound. Hence, driving noise of the lens driver 106 is recorded to set a sound pressure level threshold. If the sound pressure levels of the audio signals in the intervals preceding and succeeding the noise mixture interval are higher than the predetermined sound pressure level threshold, a sound pressure level determination unit determines that driving noise is buried in an object sound, and inhibits noise removal processing which uses silence processing. On the other hand, if the sound pressure levels of the audio signals in the intervals preceding and succeeding the noise mixture interval are lower than the predetermined sound pressure level threshold, interpolation processing which uses silence processing is performed. This allows processing that gives less sense of discordance even if the periodicities of the audio signals in the intervals preceding and succeeding the noise mixture interval are low.

Although a single-lens reflex digital camera has been taken as an example in this embodiment, other apparatuses may be used. A compact digital camera, a mobile phone, or a smart phone, for example, may be used. That is, any apparatus may be used as long as it includes a sound collector which collects a sound, a driver which generates noise, and a processor which performs processing of interpolating a sound in the period in which noise is generated in an audio signal, based on a sound in the period in which no noise is generated.

According to this embodiment, it is possible to reduce driving noise generated upon driving of the driver, which is contained in an audio signal collected by the sound collector. To do this, the audio signal is interpolated using a preceding audio predicted signal generated based on an audio signal in an interval preceding a noise generation interval, which contains driving noise, and/or a succeeding audio predicted signal generated based on an audio signal in an interval succeeding the noise generation interval. That is, the audio signal in the noise generation interval is interpolated using an interpolation audio signal implemented by a preceding audio predicted signal and/or a succeeding audio predicted signal. Especially, in this embodiment, one or both of a preceding audio predicted signal and a succeeding audio predicted signal are used based on the periodicity of an audio signal in an interval preceding a noise generation interval, and the periodicity of an audio signal in an interval succeeding the noise generation interval. Alternatively, the ratio between a preceding audio predicted signal and succeeding audio predicted signal used is determined based on the periodicity of an audio signal in an interval preceding a noise generation interval, and the periodicity of an audio signal in an interval succeeding the noise generation interval. That is, a method of generating an interpolation signal for interpolating an audio signal in a noise generation interval is switched based on the periodicity of an audio signal in an interval preceding the noise generation interval, and the periodicity of an audio signal in an interval succeeding the noise generation interval.

Second Embodiment

An imaging apparatus and an information processing apparatus according to the second embodiment will be described below with reference to FIGS. 13 to 16.

Figure 13:
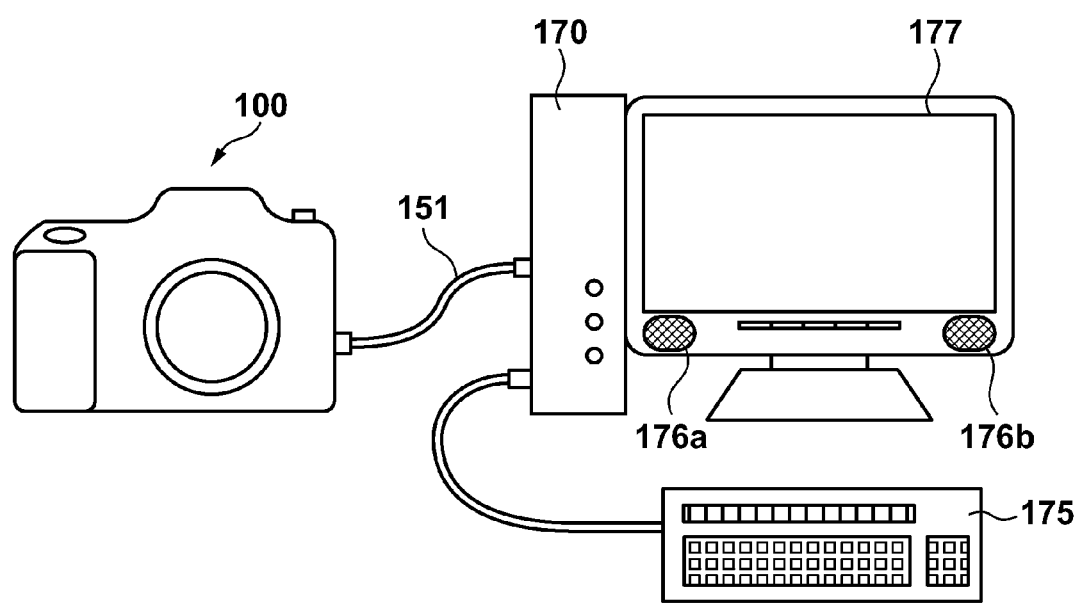
FIG. 13 is a view showing the entire system in the second embodiment.
Figure 14:
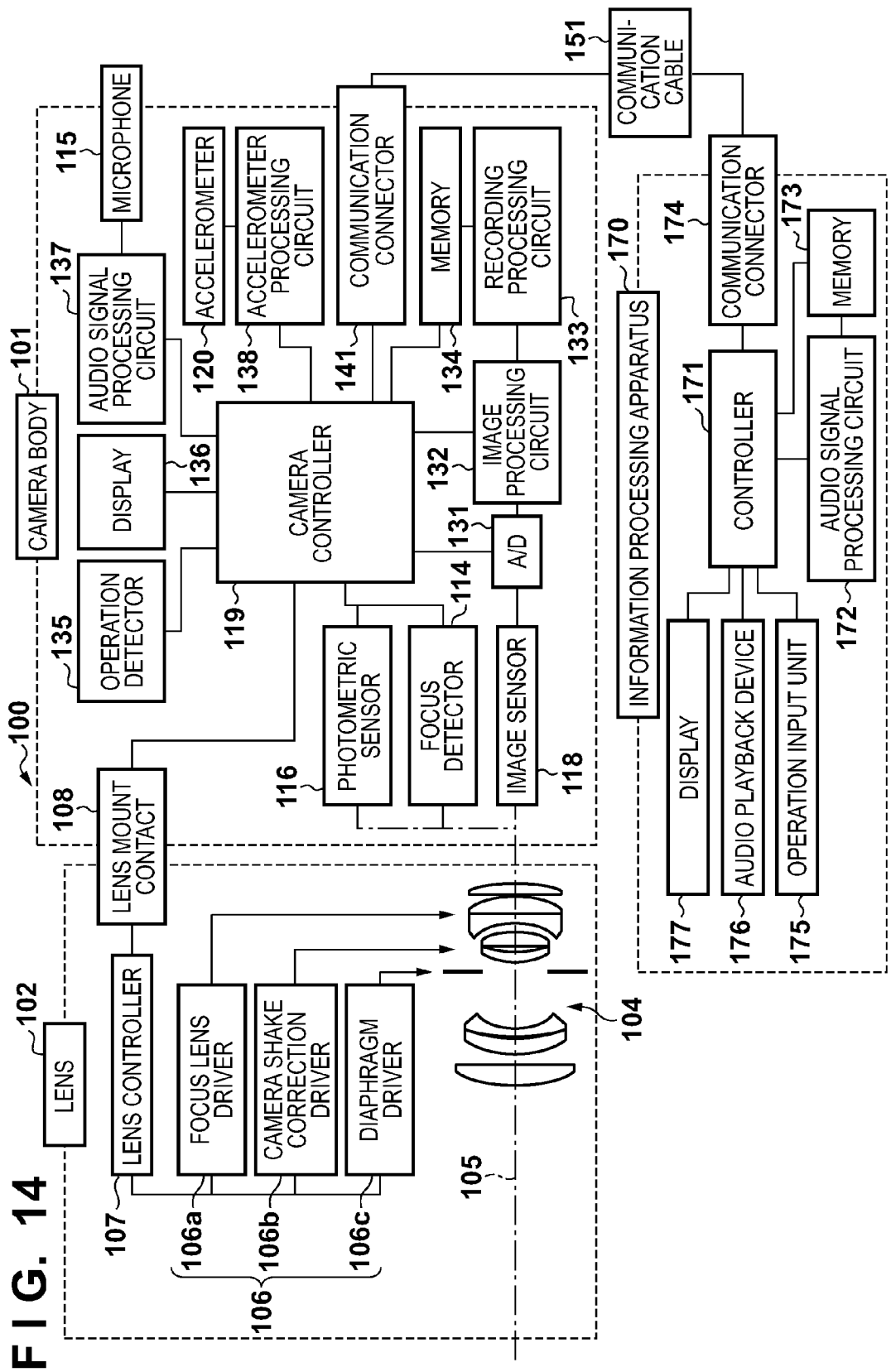
FIG. 14 is a block diagram of a single-lens reflex digital camera and information processing apparatus in the second embodiment.

FIG. 13 is a view showing a system including a single-lens reflex digital camera and information processing apparatus in the second embodiment, in which a single-lens reflex digital camera 100 and an information processing apparatus 170 are connected to each other via a communication cable 151. FIG. 14 is a block diagram of the single-lens reflex digital camera 100 and information processing apparatus 170 in this embodiment. A camera body 101 of the single-lens reflex digital camera 100 in this embodiment is equipped with a communication connector 141 to allow communication with an external device. The communication connector 141 is connected to a communication connector 174 of the information processing apparatus 170 via the communication cable 151. The same reference numerals as in the first embodiment denote the same constituent elements in FIGS. 13 and 14, and a description thereof will not be given.

The information processing apparatus 170 includes a controller 171, audio signal processing circuit 172, memory 173, operation input unit 175, audio playback device 176, and display 177. The controller 171 receives moving image recording data containing an audio signal recorded in a memory 134 on the side of the camera body 101 via the communication connector 174. The audio signal processing circuit 172 performs noise removal processing for the audio signal. A signal obtained by this noise removal processing is recorded in the memory 173.

In this embodiment, an audio signal which contains driving noise and has not undergone noise removal processing, and the information of a noise mixture interval (noise mixture interval timing) synchronous with the audio signal obtained as the result of detection by a noise interval detector are recorded in the memory 173. Noise removal processing is performed based on a command signal from the operation input unit 175 operated by the operator, and its progress information is output to the audio playback device 176 and display 177.

A lens driving operation and a noise removal processing operation in this embodiment will be described with reference to FIGS. 15 and 16.

Figure 15:
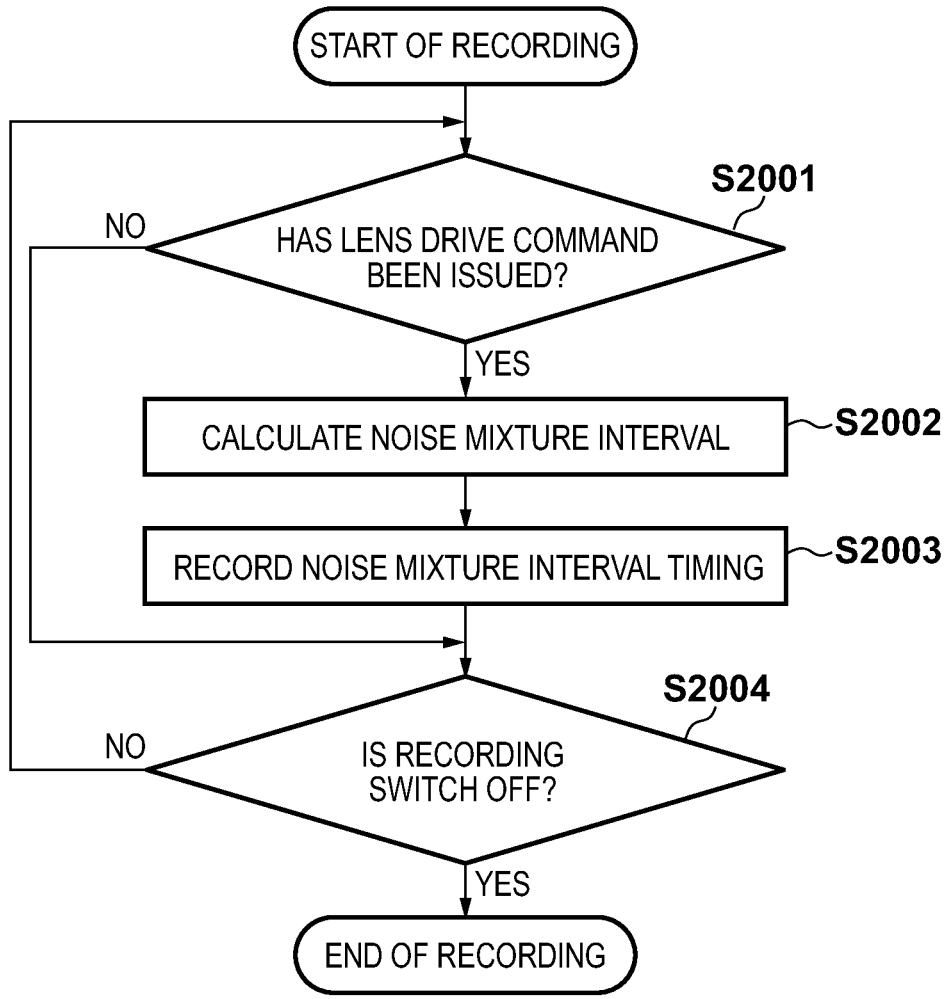
FIG. 15 is a flowchart of an operation in the camera of the second embodiment.

FIG. 15 is a flowchart of a lens driving operation and audio recording in the camera of this embodiment. When a moving image capture operation switch is turned on, a recording operation starts. In step S2001, a camera controller 119 determines whether a drive command has been issued to a lens driver 106. If no drive command to the lens driver 106 is detected in step S2001, the process advances to step S2004. Unless OFF of a recording switch is detected in step S2004, the process returns to step S2001, in which given processing is repeated.

If a lens drive command is detected in step S2001, the process advances to step S2002, in which the camera controller 119 analyzes a signal output from an accelerometer 120 to calculate a noise mixture interval. The camera controller 119 then records the timing of the noise mixture interval calculated in step S2002 in the memory 134 as a noise mixture interval timing record synchronous with an audio signal. Until OFF of the recording switch is detected in step S2004, the process returns to step S2001, in which given processing is repeated.

An operation of performing noise removal processing by the information processing apparatus 170 upon connection of the single-lens reflex digital camera 100 and the information processing apparatus 170 to each other via the communication cable 151 will be described below with reference to FIG. 16.

Figure 16:
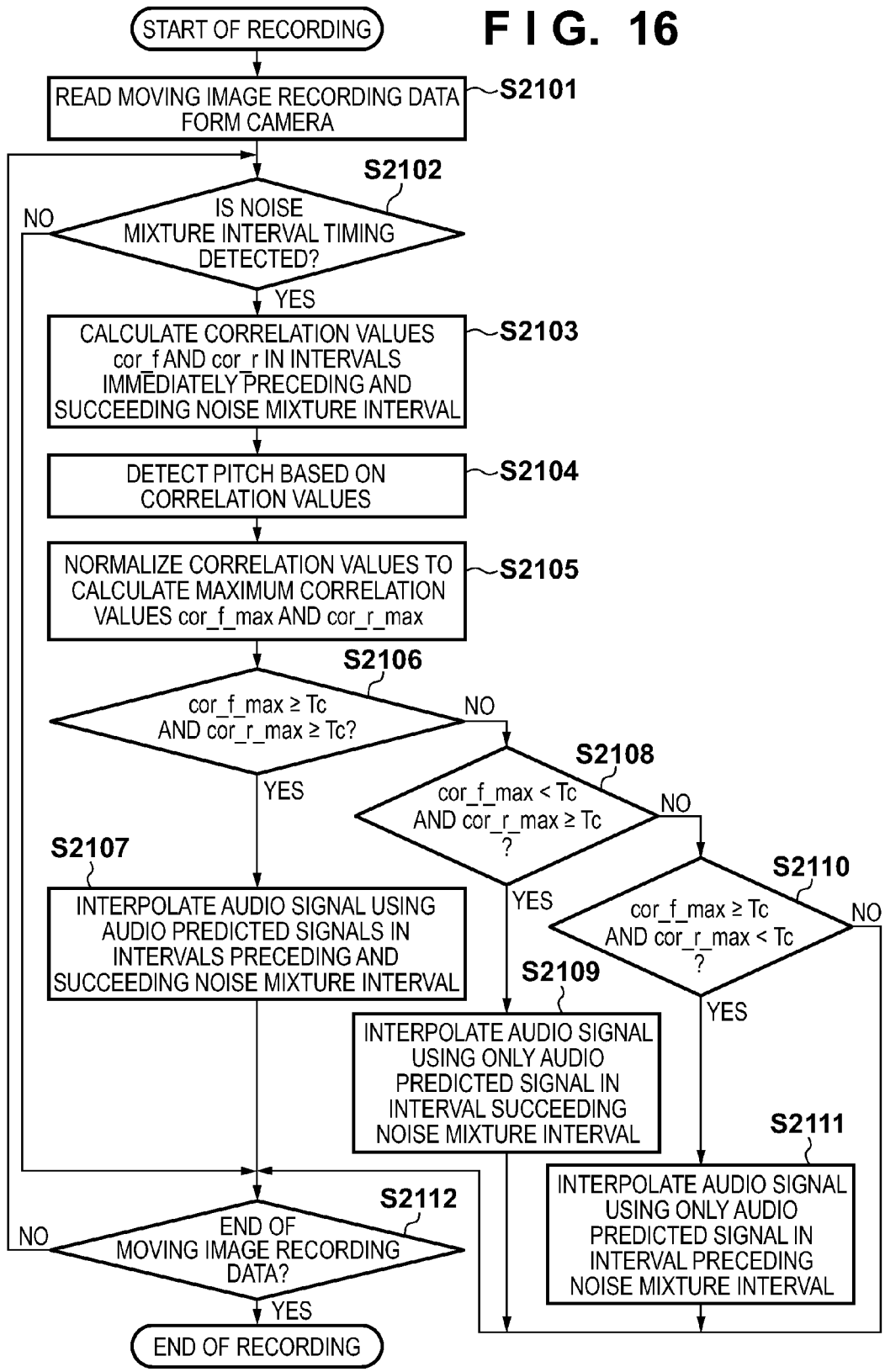
FIG. 16 is a flowchart of an operation in the information processing apparatus of the second embodiment.

When a command of a noise removal processing operation is input via the operation input unit 175, processing corresponding to the flowchart shown in FIG. 16 starts in the single-lens reflex digital camera 100 and information processing apparatus 170.

First, the information processing apparatus 170 reads moving image recording data containing an audio signal mixed with driving noise recorded in the memory 134 within the camera body 101, and a noise mixture interval timing record via the communication cable 151 (step S2101).

In step S2102, it is determined whether a noise mixture interval timing record is present in the moving image recording data. If it is determined in step S2102 that no noise mixture interval timing record is present in the moving image recording data, the process advances to step S2112. On the other hand, if a noise mixture interval timing record is detected in step S2102, the process advances to step S2103. A series of operations in steps S2103 to S2111 are the same as that in steps S1003 to S1011, respectively, in the first embodiment, and a description thereof will not be given. Until the end of read moving image recording data is detected in step S2112, the process returns to step S2101, in which given processing is repeated. If the end of moving image recording data is detected in step S2112, the process ends.

Figure 17:
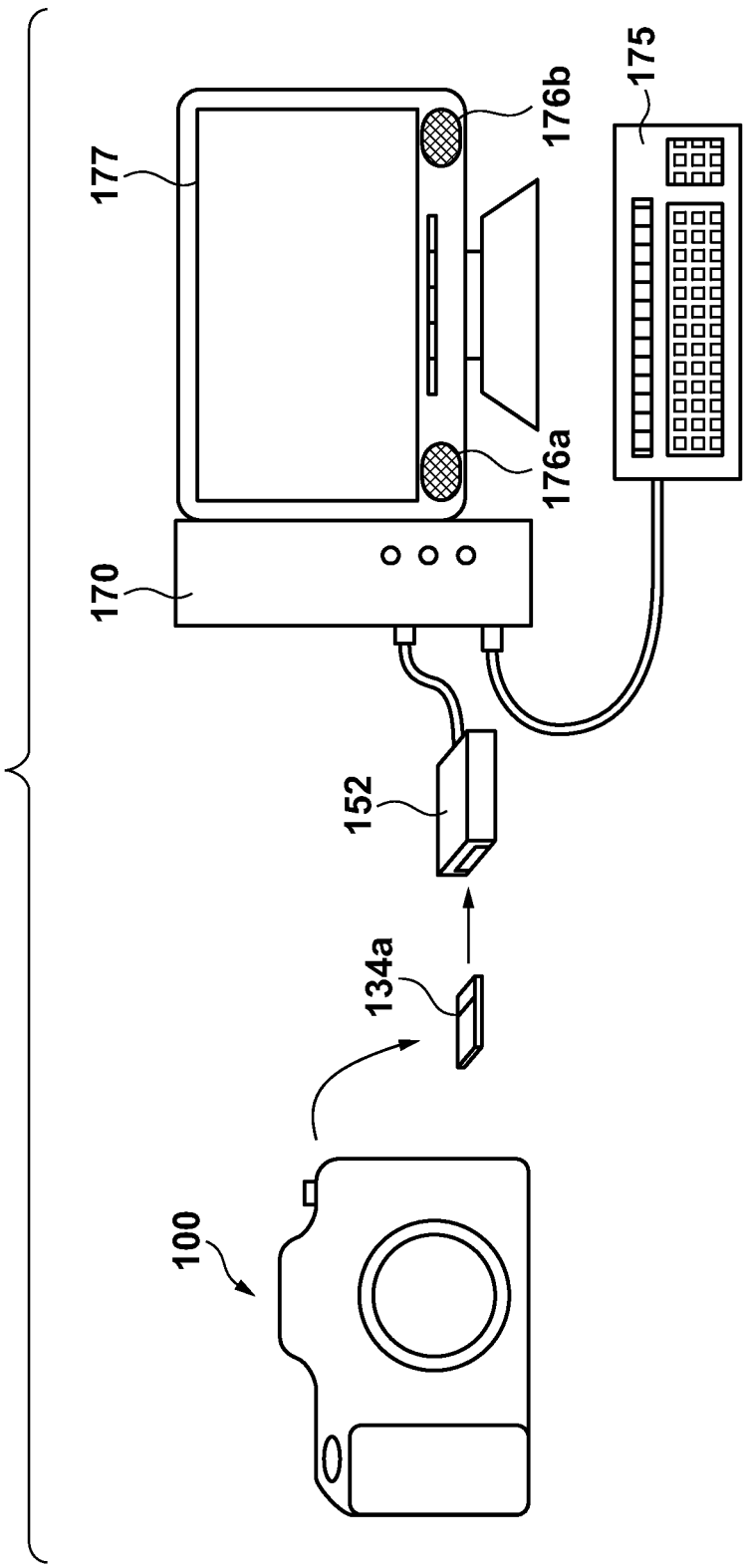
FIG. 17 is a view showing the entire system when a memory card reader is used in the second embodiment.
Figure 19A:
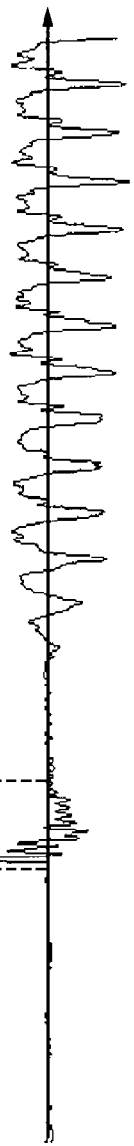
FIGS. 19A and 19B are waveform charts illustrating another example of audio signal waveforms upon driving noise mixture.
Figure 19B:
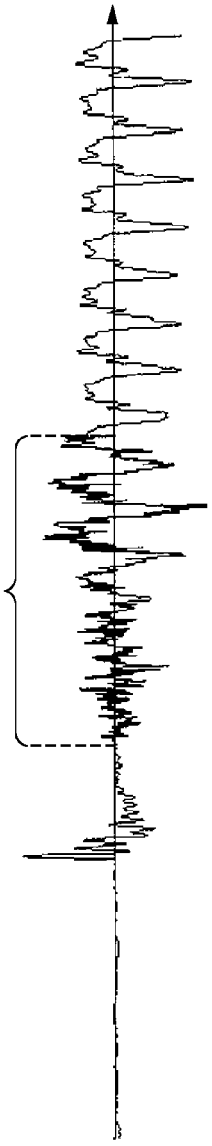
Figure 20:
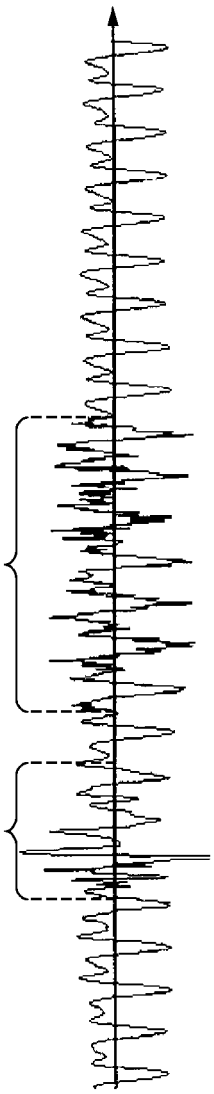
FIG. 20 is a waveform chart illustrating still another example of an audio signal waveform upon driving noise mixture.

In the above-mentioned second embodiment, noise removal processing is performed as the single-lens reflex digital camera 100 and the information processing apparatus 170 are electrically connected to each other via the communication cable 151, and exchange moving image recording data containing an audio signal record and noise mixture interval timing record by communication. However, the present invention is not limited to this mode, and the following configuration, for example, may be used. In a view of the entire system shown in FIG. 17, the memory 134 of the single-lens reflex digital camera 100 which records moving image recording data is implemented by a memory card 134a detachable from the camera body 101. In this case, the memory card 134a which records the moving image recording data is inserted into a memory card reader 152 such that the moving image recording data can be transferred to the information processing apparatus 170, and noise removal processing is performed. This obviates the need to connect the single-lens reflex digital camera 100 and the information processing apparatus 170 to each other via the communication cable 151. In the noise removal processing operation, step S2101 in FIG. 16 is simply changed to an operation of reading the moving image recording data from the memory card. If the information processing apparatus 170 is equipped with a device for reading data from the memory card 134a, the memory card reader 152 is unnecessary. That is, the information processing apparatus 170 in this embodiment can also be operated solely. Any apparatus may be used as the information processing apparatus 170 in this embodiment as long as it can process an audio signal. A personal computer, a smart phone, an imaging apparatus, or a television, for example, may be used.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-264109, filed Dec. 1, 2011, which is hereby incorporated by reference herein in its entirety.

What is claimed is:
1. An audio processing apparatus comprising:
an obtaining unit configured to obtain an audio signal; and
a processor configured to process the audio signal;
wherein the processor generates a first predicted signal based on an audio signal in a first period preceding a noise period which contains noise in the audio signal, and generates a second predicted signal based on an audio signal in a second period succeeding the noise period, wherein the processor combines the first predicted signal and the second predicted signal to generate an interpolation signal for replacing an audio signal in the noise period, wherein the processor detects a periodicity of the audio signal in the first period and a periodicity of the audio signal in the second period and changes a combining ratio of the first predicted signal and the second predicted signal in accordance with the detected periodicity of the audio signal in the first period and the detected periodicity of the audio signal in the second period, and wherein the processor replaces the audio signal in the noise period with the interpolation signal for reducing the noise in the audio signal.

2. The apparatus according to claim 1, wherein the processor does not replace the audio signal in the noise period with the interpolation signal if the periodicity of the audio signal in the first period and the periodicity of the audio signal in the second period are lower than a predetermined threshold.

3. The apparatus according to claim 1, wherein the processor changes the combining ratio such that the combining ratio of the second predicted signal is larger than the combining ratio of the first predicted signal if the periodicity of the audio signal in the first period is lower than a predetermined threshold.

4. The apparatus according to claim 1, wherein the processor changes the combining ratio such that the combining ratio of the first predicted signal is larger than the combining ratio of the first predicted signal if the periodicity of the audio signal in the second period is lower than a predetermined threshold.

5. An audio processing method comprising:
obtaining an audio signal;
generating a first predicted signal based on an audio signal in a first period preceding a noise period which contains noise in the audio signal, and generating a second predicted signal based on an audio signal in a second period succeeding the noise period;
combining the first predicted signal and the second predicted signal to generate an interpolation signal for replacing an audio signal in the noise period;
detecting a periodicity of the audio signal in the first period and a periodicity of the audio signal in the second period;
changing a combining ratio of the first predicted signal and the second predicted signal in accordance with the detected periodicity of the audio signal in the first period and the detected periodicity of the audio signal in the second period; and
replacing the audio signal in the noise period with the interpolation signal for reducing the noise in the audio signal.

6. An imaging apparatus comprising:
an imaging unit configured to obtain an image signal;
an obtaining unit configured to obtain an audio signal; and
a processor configured to process the audio signal;
wherein the processor generates a first predicted signal based on an audio signal in a first period preceding a noise period which contains noise in the audio signal, and generates a second predicted signal based on an audio signal in a second period succeeding the noise period,
wherein the processor combines the first predicted signal and the second predicted signal to generate an interpolation signal for replacing an audio signal in the noise period, wherein the processor detects a periodicity of the audio signal in the first period and a periodicity of the audio signal in the second period and changes a combining ratio of the first predicted signal and the second predicted signal in accordance with the detected periodicity of the audio signal in the first period and the detected periodicity of the audio signal in the second period, and
wherein the processor replaces the audio signal in the noise period with the interpolation signal for reducing the noise in the audio signal.

7. The apparatus according to claim 6, wherein the processor does not replace the audio signal in the noise period with the interpolation signal if the periodicity of the audio signals in the first period and the periodicity of the audio signal in the second period are lower than a predetermined threshold.

8. The apparatus according to claim 6, wherein the processor changes the combining ratio such that the combining ratio of the second predicted signal is larger than the combining ratio of the first predicted signal if the periodicity of the audio signal in the first period is lower than a predetermined threshold.

9. The apparatus according to claim 6, wherein the processor changes the combining ratio such that the combining ratio of the first predicted signal is larger than the combining ratio of the first predicted signal if the periodicity of the audio signal in the second period is lower than a predetermined threshold.

10. The apparatus according to claim 6, wherein the processor detects the noise period based on driving of a driving unit of the imaging unit.

11. The apparatus according to claim 6, wherein the processor detects the noise period based on driving of a lens of the imaging unit.

12. The apparatus according to claim 6, wherein the processor detects the noise period based on driving of a diaphragm of the imaging unit.

13. The apparatus according to claim 6, wherein the processor detects the noise period based on a frequency analysis result of the audio signal.

* * * * *